(12) United States Patent
Guo et al.

(10) Patent No.: US 11,546,410 B2
(45) Date of Patent: Jan. 3, 2023

(54) DEVICE AND METHOD FOR ADAPTIVELY CHANGING TASK-PERFORMING SUBJECTS

(71) Applicant: Samsung Electronics Co., Ltd., Suwon-si (KR)

(72) Inventors: Xieming Guo, Guangdong (CN); Jae-Sun Park, Suwon-si (KR); Jiayan Liang, Guangdong (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/029,490

(22) Filed: Sep. 23, 2020

(65) Prior Publication Data

US 2021/0006616 A1 Jan. 7, 2021

Related U.S. Application Data

(63) Continuation of application No. 15/521,051, filed as application No. PCT/KR2015/011290 on Oct. 23, 2015, now abandoned.

(30) Foreign Application Priority Data

Oct. 23, 2014 (CN) .................. 201410572718.8

(51) Int. Cl.
*H04W 84/04* (2009.01)
*H04L 67/04* (2022.01)
(Continued)

(52) U.S. Cl.
CPC .............. *H04L 67/04* (2013.01); *G06F 1/163* (2013.01); *G06F 3/016* (2013.01);
(Continued)

(58) Field of Classification Search
None
See application file for complete search history.

(56) References Cited

U.S. PATENT DOCUMENTS 6,523,023 B1 2/2003 Sonnenberg
6,714,233 B2 3/2004 Chihara et al.
(Continued)

FOREIGN PATENT DOCUMENTS

CN 102348251 A 2/2012
CN 102983890 A 3/2013
(Continued)

OTHER PUBLICATIONS

European Office Action dated Jan. 24, 2019, issued in European Application No. 15852153.4.
(Continued)

*Primary Examiner* — Willie J Daniel, Jr.
(74) *Attorney, Agent, or Firm* — Jefferson IP Law, LLP

(57) ABSTRACT

Provided is an electronic device and method for receiving identification information about a mobile device from the mobile device, determining based on the identification information, the mobile device as a peer device for performing an operation of the electronic device along with, or instead of, the electronic device, and determining at least one from among the peer device and the electronic device, the determined at least one performing the operation of the electronic device, based on a condition of the electronic device.

17 Claims, 18 Drawing Sheets

(51) Int. Cl.

| | | |
|---|---|---|
| *H04W 8/20* | (2009.01) | |
| *H04W 88/02* | (2009.01) | |
| *H04W 4/16* | (2009.01) | |
| *G06F 1/16* | (2006.01) | |
| *G06F 3/01* | (2006.01) | |
| *H04L 12/28* | (2006.01) | |
| *H04W 4/20* | (2018.01) | |
| *H04W 12/06* | (2021.01) | |
| *H04W 12/08* | (2021.01) | |
| *H04L 67/10* | (2022.01) | |
| *H04W 4/80* | (2018.01) | |
| *H04W 76/11* | (2018.01) | |
| *H04W 8/00* | (2009.01) | |
| *H04W 84/12* | (2009.01) | |

(52) U.S. Cl.
CPC .......... *H04L 12/2812* (2013.01); *H04W 4/16* (2013.01); *H04W 4/20* (2013.01); *H04W 8/20* (2013.01); *H04W 12/06* (2013.01); *H04W 12/08* (2013.01); *H04W 88/02* (2013.01); *H04L 67/10* (2013.01); *H04W 4/80* (2018.02); *H04W 8/005* (2013.01); *H04W 76/11* (2018.02); *H04W 84/12* (2013.01)

(56) References Cited

U.S. PATENT DOCUMENTS

| | | |
|---|---|---|
| 7,164,885 B2 | 1/2007 | Jonsson et al. |
| 10,468,021 B2 * | 11/2019 | Kim ................... G10L 15/22 |
| 2004/0176958 A1 | 9/2004 | Salmenkaita et al. |
| 2005/0050028 A1 | 3/2005 | Rose et al. |
| 2014/0045473 A1 | 2/2014 | Salisbury et al. |
| 2014/0106677 A1 | 4/2014 | Altman |
| 2014/0181916 A1 | 6/2014 | Koo et al. |
| 2014/0218184 A1 | 8/2014 | Grant et al. |
| 2014/0314059 A1 | 10/2014 | Yoon et al. |
| 2016/0044151 A1 | 2/2016 | Shoemaker et al. |

FOREIGN PATENT DOCUMENTS

| | | |
|---|---|---|
| EP | 1 139 116 A1 | 10/2001 |
| KR | 10-2003-0056736 A | 7/2003 |
| KR | 10-2012-0119959 A | 11/2012 |
| KR | 10-2014-0080958 A | 7/2014 |
| KR | 10-1420574 B1 | 7/2014 |
| KR | 10-2014-0098597 A | 8/2014 |
| KR | 10-2014-0099831 A | 8/2014 |
| KR | 10-2014-0138363 A | 12/2014 |
| WO | 2008/052334 A1 | 5/2008 |
| WO | 2013/133836 A1 | 9/2013 |
| WO | 2014/062714 A1 | 4/2014 |

OTHER PUBLICATIONS

Chinese Office Action dated Feb. 19, 2019, issued in Chinese Application No. 201410572718.8.
Indian Office Action dated Feb. 26, 2020, issued in Indian Patent Application No. 201717017514.
Extended European Search Report dated Jul. 22, 2020, issued in European Patent Application No. 20170714.8.
Korean Office Action dated Sep. 23, 2021, issued in Korean Patent Application No. 10-2015-0148341.

* cited by examiner

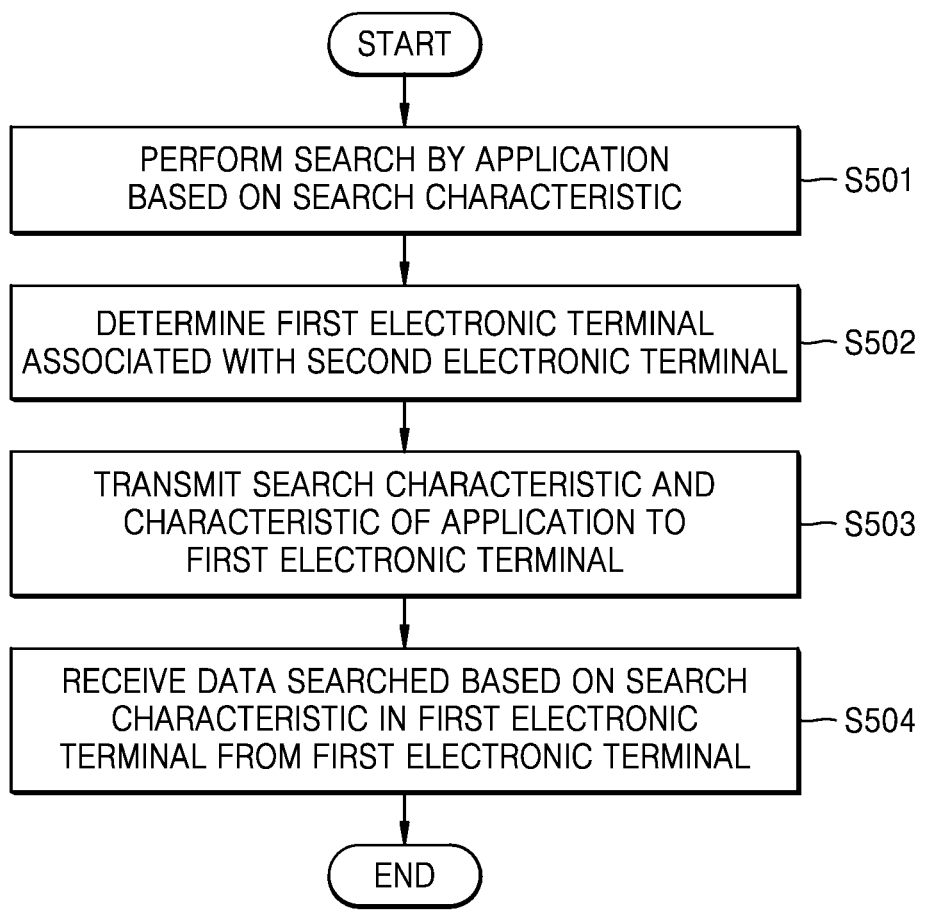

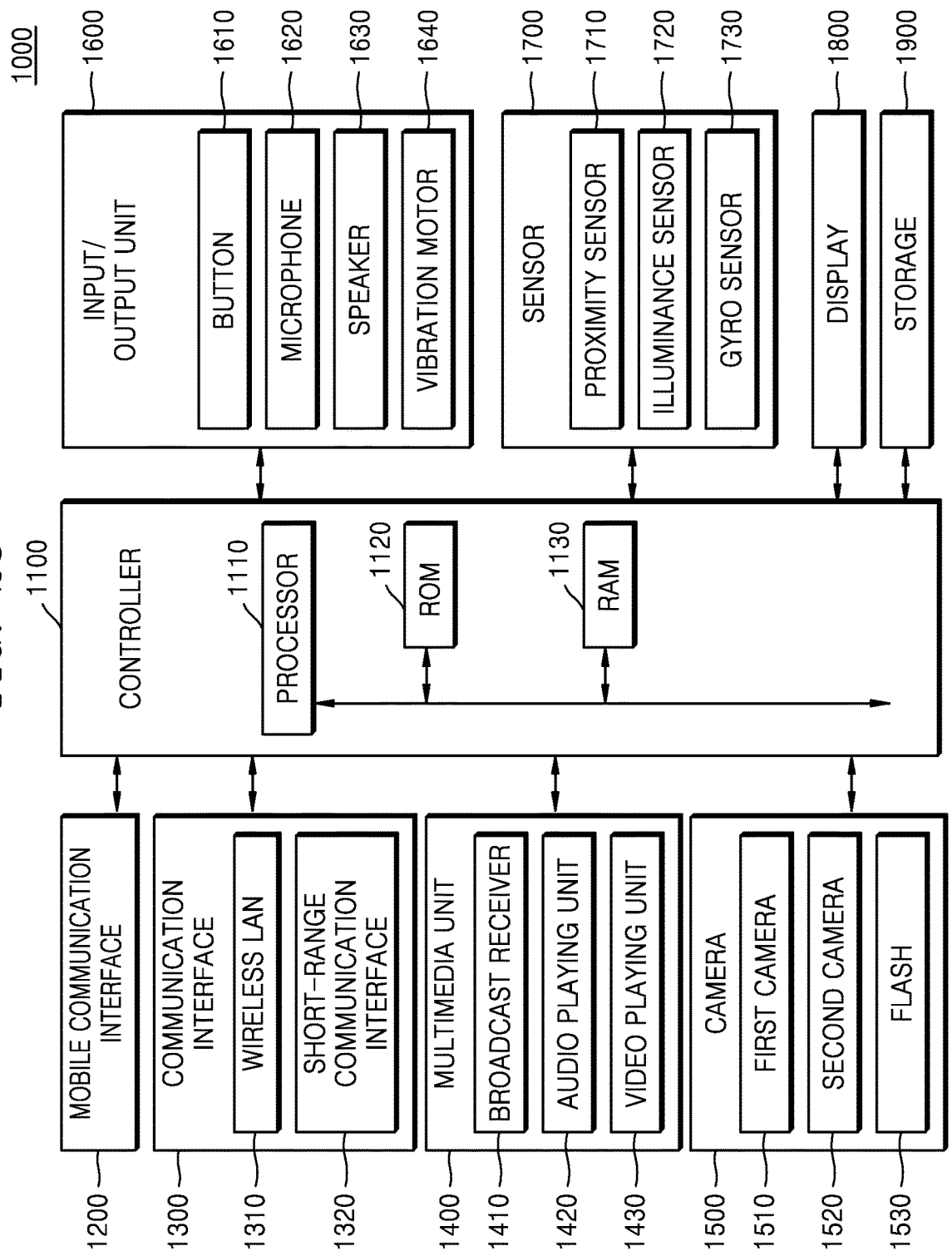

DEVICE AND METHOD FOR ADAPTIVELY CHANGING TASK-PERFORMING SUBJECTS

CROSS-REFERENCE TO RELATED APPLICATION(S)

This application is a continuation application of prior application Ser. No. 15/521,051, filed on Apr. 21, 2017, which application is a U.S. National Stage application under 35 U.S.C. § 371 of an International application number PCT/KR2015/011290, filed on Oct. 23, 2015, which is based on and claimed priority under 35 U.S.C. § 119(a) of a Chinese patent application number 201410572718.8, filed on Oct. 23, 2014, in the Chinese Intellectual Property Office, the disclosure of which is incorporated by reference herein in its entirety.

TECHNICAL FIELD

The present disclosure relates to an apparatus and method for adaptively changing a subject performing an operation, and more particularly, to an apparatus and method for adaptively changing a subject performing an operation, according to a condition of the apparatus.

BACKGROUND ART

With advances in internet technology (IT), the number of users carrying electronic devices, including laptops, smartphones, and tablet computers, is increasing.

Users may want to use their electronic devices simultaneously and continuously.

A cloud service may be used for simultaneous and continuous use of electronic devices. For example, a user may edit a document on a smartphone, and then continue editing it on other electronic devices by using the cloud service.

When using the cloud service, resources of electronic devices may be wasted to store and process the same data downloaded from a cloud server. When an electronic device does not store data from the cloud server, the electronic device needs to access the cloud server to download the data. The electronic device needs to connect to the Internet in order to access the cloud server.

Therefore, technology for simultaneous and continuous use of electronic devices, which does not waste resources of all of the electronic devices, is needed.

DISCLOSURE

Technical Problem

According to example embodiments, electronic devices may be used more efficiently.

Technical Solution

Provided is a method including: acquiring, by a first electronic terminal, user data associated with an application program, from a second electronic terminal; and setting the acquired user data as user data of the application program in the first electronic terminal, wherein the second electronic terminal is associated with the first electronic terminal, and the application program, which matches with that of the second electronic terminal, is installed in the first electronic terminal.

The acquiring is performed when installing or executing the application program in the first electronic terminal.

The user data associated with the application program is acquired from the second electronic terminal through an association channel or another communication channel.

When the association channel is unable to be established, the user data associated with the application program is acquired from the second electronic terminal through the other communication channel.

The user data includes personalized data generated by the application program.

The personalized data includes at least one from among input history data, browsing history data, and operation step history data.

The input history data includes search history data.

The method further includes: receiving a search characteristic and a characteristic of the application program from the second electronic terminal; performing a search, by a search application program indicated by the characteristic of the application program, according to the search characteristic; and transmitting found data to the second electronic terminal.

The method further includes: when logging in to the application program in the first electronic terminal with an account, determining a usage situation of the account in the matched application program in the second electronic terminal; and when it is determined that the usage situation meets a predetermined condition, logging in to the application program in the first electronic terminal with the account without performing additional authentication in the second electronic terminal.

The usage situation is determined based on the user data, which is associated with the application data, acquired from the second electronic terminal.

The second electronic terminal associated with the first electronic terminal is determined according to association information recorded in the first electronic terminal.

The second electronic terminal associated with the first electronic terminal is determined based on an account.

Provided is a method including: acquiring, by a second electronic terminal, user data associated with an application program; and transmitting to a first electronic terminal the acquired user data, wherein the second electronic terminal is associated with the first electronic terminal, and the application program, which matches with that of the second electronic terminal, is installed in the first electronic terminal.

The user data is transmitted to the first electronic terminal through an association channel or another communication channel.

When the association channel is unable to be established, the user data is transmitted to the first electronic terminal through the other communication channel.

The acquiring the user data associated with the application program includes: detecting an update of the user data associated with the application program; and acquiring the user data associated with the application program upon detecting the update.

The update is detected upon establishment of the association communication channel.

The user data includes personalized data generated by the application program.

The personalized data includes at least one from among input history data, browsing history data, and operation step history data.

The input history data includes search history data.

The method further includes: performing a search, by the application program in the second electronic terminal, according to a search characteristic; and transmitting the search characteristic and a characteristic of the application program to the first electronic terminal; and receiving, from the first electronic terminal, data found by the application program in the first electronic terminal according to the search characteristic.

The first electronic terminal associated with the second electronic terminal is determined according to association information recorded in the second electronic terminal.

The first electronic terminal associated with the second electronic terminal is determined based on an account.

Provided is a method including: performing a search by an application program in a second electronic terminal according to a search characteristic; determining a first electronic terminal associated with the second electronic terminal; transmitting the search characteristic and a characteristic of the application program to the first electronic terminal; and receiving, from the first electronic terminal, data found by the application program in the first electronic terminal according to the search characteristic.

The method further includes: displaying in the second electronic terminal the data found by the application program in the first electronic terminal to be distinguished from data found by the second electronic terminal.

The search characteristic includes an input search keyword.

When the search characteristic is a search characteristic for searching an image and/or a video, whether the first electronic terminal is provided with a camera is determined; and when the first electronic terminal is provided with the camera, the search characteristic and the characteristic of the application program are transmitted to the first electronic terminal.

Through the association channel or the other communication channel, the search characteristic and the characteristic of the application program are transmitted to the first electronic terminal and the data found by the application program in the first electronic terminal according to the search characteristic is received from the first electronic terminal.

When the association channel is unable to be established, through the other communication channel, the search characteristic and the characteristic of the application program are transmitted to the first electronic terminal and the data found by the application program in the first electronic terminal according to the search characteristic is received from the first electronic terminal.

The method further includes: transmitting a search history record to the first electronic terminal.

The first electronic terminal associated with the second electronic terminal is determined according to association information recorded in the second electronic terminal.

The first electronic terminal associated with the second electronic terminal is determined based on an account.

Provided is a method including receiving, by a first electronic terminal, a search characteristic and a characteristic of an application program from a second electronic terminal; performing a search, by the application program in the first electronic terminal according to the search characteristic; and transmitting found data to the second electronic terminal.

The search characteristic includes a search keyword.

When the search characteristic is a search characteristic for searching an image and/or a video, the method further includes: determining whether the first electronic terminal is provided with a camera; and notifying the second electronic terminal without performing the search when it is determined that the first electronic terminal is not provided with a camera, wherein the search is performed when it is determined that the first electronic terminal is provided with a camera.

Through the association channel or the other communication channel, the search characteristic and the characteristic of the application program are received from the second electronic terminal and the data found by the application program in the first electronic terminal according to the search characteristic is transmitted to the second electronic terminal.

When the association channel is unable to be established, through the other communication channel, the search characteristic and the characteristic of the application program are received from the second electronic terminal and the data found by the application program in the first electronic terminal according to the search characteristic transmitted to the second electronic terminal.

The method further includes storing the search characteristic as a search history of the application program.

The second electronic terminal associated with the first electronic terminal is determined according to association information recorded in the first electronic terminal.

The second electronic terminal associated with the first electronic terminal is determined based on an account.

Provided is an electronic terminal including: a user data acquiring unit configured to acquire user data associated with an application program from another electronic terminal; and a user data setting unit configured to set the acquired user data as user data of the application program in the electronic terminal, wherein the other electronic terminal is associated with the electronic terminal, and the application program which matches with that of the other electronic terminal is installed in the electronic terminal.

The user data acquiring unit is further configured to acquire the user data associated with the application program from other electronic terminal when installing or executing the application program in the electronic terminal.

The user data acquiring unit is further configured to acquire the user data associated with the application program from the other electronic terminal through an association channel or another communication channel.

The user data acquiring unit is further configured to acquire, when the association channel is unable to be established, the user data associated with the application program from the other electronic terminal through the other communication channel.

The user data includes personalized data generated by the application program.

The personalized data includes at least one from among input history data, browsing history data, and operation step history data.

The input history data includes search history data.

The electronic terminal further includes: a receiving unit configured to receive a search characteristic and a characteristic of the application program from the other electronic terminal; a searching unit, through which a search is performed by a search application program indicated by the characteristic of the application program according to the search characteristic; and a transmitting unit configured to transmit found data to the other electronic terminal.

The electronic terminal further includes: a determining unit configured to determine, when logging in to the application program in the electronic terminal with an account, a usage situation of the account in the matched application program in the other electronic terminal; and a login unit configured to log in, when it is determined that the usage situation meets a predetermined condition, to the application program in the electronic terminal with the account without performing additional authentication in the other electronic terminal.

The determining unit is further configured to determine the usage situation based on the user data, which is associated with the application data, acquired from the other electronic terminal.

The electronic terminal further includes an association determining unit configured to determine the other electronic terminal associated with the electronic terminal according to association information recorded in the electronic terminal.

The electronic terminal further includes an association determining unit configured to determine the other electronic terminal associated with the electronic terminal through an account.

Provided is an electronic terminal including: a user data acquiring unit configured to acquire user data associated with an application program; and a user data transmitting unit configured to transmit to the other electronic terminal the acquired user data, wherein the electronic terminal is associated with the other electronic terminal, and the application program, which matches with that of the other electronic terminal, is installed in the electronic terminal.

The user data transmitting unit is further configured to transmit the user data to the other electronic terminal through an association channel or another communication channel.

The user data acquiring unit includes a detecting unit configured to detect an update of the user data associated with the application program, wherein the user data acquiring unit is further configured to acquire the user data associated with the application program upon detecting the update.

The detecting unit is further configured to detect the update upon establishment of the association communication channel.

The user data includes personalized data generated by the application program.

The personalized data includes at least one from among input history data, browsing history data, and operation step history data.

The input history data includes search history data.

Provided is an electronic terminal including: a searching unit, through which a search is performed by an application program in the electronic terminal according to a search characteristic; a transmitting unit configured to transmit the search characteristic and a characteristic of the application program to the other electronic terminal; and a receiving unit configured to receive from the other electronic terminal, data found by the application program in the other electronic terminal according to the search characteristic.

The electronic terminal further includes an association determining unit configured to determine the other electronic terminal associated with the electronic terminal according to association information recorded in the electronic terminal.

The electronic terminal further includes an association determining unit configured to determine the other electronic terminal associated with the electronic terminal through an account.

Provided is an electronic terminal including: a searching unit, through which a search is performed by an application program in the electronic terminal according to a search characteristic; an association determining unit configured to determine another electronic terminal associated with the electronic terminal; a transmitting unit configured to transmit the search characteristic and a characteristic of the application program to the other electronic terminal; and a receiving unit configured to receive from the other electronic terminal, data found by the application program in the other electronic terminal according to the search characteristic.

The electronic terminal further includes a display configured to display the data found by the application program in the other electronic terminal to be distinguished from data found by the electronic terminal.

The search characteristic includes an input search keyword.

The transmitting unit is further configured to determine, when the search characteristic is a search characteristic for searching an image and/or a video, whether the other electronic terminal is provided with a camera, and then transmit the search characteristic and the characteristic of the application program to the other electronic terminal when the other electronic terminal is provided with the camera.

The transmitting unit and the receiving unit are further configured to respectively, through the association channel or the other communication channel, transmit the search characteristic and the characteristic of the application program to the other electronic terminal and receive the data found by the application program in the other electronic terminal according to the search characteristic from the other electronic terminal.

The transmitting unit and the receiving unit are further configured to respectively, through the other communication channel, transmit the search characteristic and the characteristic of the application program to the other electronic terminal and receive the data found by the application program in the other electronic terminal according to the search characteristic from the other electronic terminal when the association channel is unable to be established.

The electronic terminal further includes a search history transmitting unit configured to transmit a search history record to the first electronic terminal.

The association determining unit is further configured to determine the other electronic terminal associated with the electronic terminal according to association information recorded in the electronic terminal.

The association determining unit is further configured to determine the other electronic terminal associated with the electronic terminal through an account.

Provided is an electronic terminal including: a receiving unit configured to receive a search characteristic and a characteristic of an application program from another electronic terminal; a searching unit, through which a search is performed by the application program in the electronic terminal according to the search characteristic; and a transmitting unit configured to transmit found data to the other electronic terminal, wherein the electronic terminal is associated with the other electronic terminal.

The search characteristic includes an input search keyword.

The electronic terminal further includes a determining unit configured to determine, when the search characteristic is a search characteristic for searching an image and/or a video, whether the electronic terminal is provided with a camera, wherein the searching unit is further configured to notify the other electronic terminal without performing the search when it is determined that the electronic terminal is not provided with a camera, and performs the search when it is determined that the electronic terminal is provided with a camera.

The receiving unit and the transmitting unit are further configured to respectively, through the association channel or the other communication channel, receive the search characteristic and the characteristic of the application program from the other electronic terminal and transmit the found data to the other electronic terminal.

The receiving unit and the transmitting unit are further configured to respectively, through the other communication channel, receive the search characteristic and the characteristic of the application program from the other electronic terminal and transmit the found data to the other electronic terminal when the association channel is unable to be established.

The electronic terminal further includes a storing unit configured to store the search characteristic as a search history of the application program.

The electronic terminal further includes an association determining unit configured to determine the other electronic terminal associated with the electronic terminal according to association information recorded in the electronic terminal.

Provided is an electronic terminal including: a user data acquiring unit configured to acquire user data associated with an application program from another electronic terminal; and a user data setting unit configured to set the acquired user data as user data of the application program in the electronic terminal.

The user data acquiring unit is further configured to acquire the user data associated with the application program from other electronic terminal when installing or executing the application program in the electronic terminal.

The user data acquiring unit is further configured to acquire the user data associated with the application program from the other electronic terminal through an association channel or another communication channel.

The user data acquiring unit is further configured to acquire, when the association channel is unable to be established, the user data associated with the application program from the other electronic terminal through the other communication channel.

The user data includes personalized data generated by the application program.

The personalized data includes at least one from among input history data, browsing history data, and operation step history data.

The input history data includes search history data.

Provided is an electronic terminal including: a receiving unit configured to receive a search characteristic and a characteristic of an application program from another electronic terminal; a searching unit, through which a search is performed by a search application program indicated by the characteristic of the application program according to the search characteristic; and a transmitting unit configured to transmit found data to the other electronic terminal.

The electronic terminal further includes: a determining unit configured to determine, when logging in to the application program in the electronic terminal with an account, a usage situation of the account in the matched application program in the other electronic terminal; and a login unit configured to log in, when it is determined that the usage situation meets a predetermined condition, to the application program in the electronic terminal with the account without performing additional authentication in the other electronic terminal.

The determining unit is further configured to determine the usage situation based on the user data, which is associated with the application data, acquired from the other electronic terminal.

The electronic terminal further includes an association determining unit configured to determine the other electronic terminal associated with the electronic terminal according to association information recorded in the electronic terminal.

The electronic terminal further includes an association determining unit configured to determine the other electronic terminal associated with the electronic terminal through an account.

Provided is an electronic terminal including: a user data acquiring unit configured to acquire user data associated with an application program; and a user data transmitting unit configured to transmit to the other electronic terminal the acquired user data, wherein the electronic terminal is associated with the other electronic terminal, and the application program, which matches with that of the other electronic terminal, is installed in the electronic terminal.

The user data transmitting unit is further configured to transmit the user data to the other electronic terminal through an association channel or another communication channel.

The user data transmitting unit is further configured to transmit, when the association channel is unable to be established, the user data to the other electronic terminal through the other communication channel.

The user data acquiring unit includes a detecting unit configured to detect an update of the user data associated with the application program, wherein the user data acquiring unit is further configured to acquire the user data associated with the application program upon detecting the update.

The detecting unit is further configured to detect the update upon establishment of the association communication channel.

The user data includes personalized data generated by the application program.

The personalized data includes at least one from among input history data, browsing history data, and operation step history data.

The input history data includes search history data.

Provided is an electronic terminal including: a searching unit, through which a search is performed by an application program in the electronic terminal according to a search characteristic; a transmitting unit configured to transmit the search characteristic and a characteristic of the application program to the other electronic terminal; and a receiving unit configured to receive from the other electronic terminal, data found by the application program in the other electronic terminal according to the search characteristic.

The electronic terminal further includes an association determining unit configured to determine the other electronic terminal associated with the electronic terminal according to association information recorded in the electronic terminal.

The electronic terminal further includes an association determining unit configured to determine the other electronic terminal associated with the electronic terminal through an account.

Provided is an electronic terminal including: a searching unit, through which a search is performed by an application program in the electronic terminal according to a search characteristic; an association determining unit configured to determine another electronic terminal associated with the electronic terminal; a transmitting unit configured to transmit the search characteristic and a characteristic of the application program to the other electronic terminal; and a receiving unit configured to receive from the other electronic terminal, data found by the application program in the other electronic terminal according to the search characteristic.

The electronic terminal further includes a display configured to display the data found by the application program in the other electronic terminal to be distinguished from data found by the electronic terminal.

The search characteristic includes an input search keyword.

The transmitting unit configured to determine, when the search characteristic is a search characteristic for searching an image and/or a video, whether the other electronic terminal is provided with a camera, and then transmitting the search characteristic and the characteristic of the application program to the other electronic terminal when the other electronic terminal is provided with the camera.

The transmitting unit and the receiving unit are further configured to respectively, through the association channel or the other communication channel, transmit the search characteristic and the characteristic of the application program to the other electronic terminal and receive the data found by the application program in the other electronic terminal according to the search characteristic from the other electronic terminal.

The transmitting unit and the receiving unit are further configured to respectively, through the other communication channel, transmit the search characteristic and the characteristic of the application program to the other electronic terminal and receive the data found by the application program in the other electronic terminal according to the search characteristic from the other electronic terminal when the association channel is unable to be established.

The electronic terminal further includes a search history transmitting unit configured to transmit a search history record to the first electronic terminal.

The association determining unit is further configured to determine the other electronic terminal associated with the electronic terminal according to association information recorded in the electronic terminal.

The association determining unit is further configured to determine the other electronic terminal associated with the electronic terminal through an account.

Provided is an electronic terminal including: a receiving unit configured to receive a search characteristic and a characteristic of an application program from another electronic terminal; a searching unit, through which a search is performed by the application program in the electronic terminal according to the search characteristic; and a transmitting unit configured to transmit found data to the other electronic terminal, wherein the electronic terminal is associated with the other electronic terminal.

The search characteristic includes an input search keyword.

The electronic terminal further includes a determining unit configured to determine, when the search characteristic is a search characteristic for searching an image and/or a video, whether the electronic terminal is provided with a camera, wherein the searching unit is further configured to notify the other electronic terminal without performing the search when it is determined that the electronic terminal is not provided with a camera, and performs the search when it is determined that the electronic terminal is provided with a camera.

The receiving unit and the transmitting unit are configured to respectively, through the association channel or the other communication channel, receive the search characteristic and the characteristic of the application program from the other electronic terminal and transmit the found data to the other electronic terminal.

The receiving unit and the transmitting unit are further configured to respectively, through the other communication channel, receive the search characteristic and the characteristic of the application program from the other electronic terminal and transmit the found data to the other electronic terminal when the association channel is unable to be established.

The electronic terminal further includes a storing unit configured to store the search characteristic as a search history of the application program.

The electronic terminal further includes an association determining unit configured to determine the other electronic terminal associated with the electronic terminal according to association information recorded in the electronic terminal.

The electronic terminal further includes an association determining unit configured to determine the other electronic terminal associated with the electronic terminal through an account.

According to example embodiments, an electronic terminal may acquire user data associated with an application program from another electronic terminal. According to example embodiments, when a search is performed in an electronic terminal, the electronic terminal may further acquire data found by a search application program from another electronic terminal associated with the electronic terminal without repeatedly inputting the same keyword to the other electronic terminal.

According to example embodiments, an application program, which matches with that of another electronic terminal, may be installed in an electronic terminal without a user's manual operations.

Provided is a method including: determining whether an electronic terminal is associated with another electronic terminal when installing an application in the electronic terminal; determining whether to install the application in the other electronic terminal when the electronic terminal is associated with the other electronic terminal; and transmitting information for installing the application to the other electronic terminal when it is determined to install the application in the other electronic terminal.

The information for installing the application is transmitted to the other electronic terminal through an association channel or another communication channel.

The information for installing the application is transmitted to the other electronic terminal through the other communication channel when the association channel is unable to be established.

The transmitting the information for installing the application to the other electronic terminal includes: determining a version of the application adaptive to the other electronic terminal; and transmitting information for installing the version of the application adaptive to the other electronic terminal to the other electronic terminal.

When a version of the application adaptive to the electronic terminal is the same as the version of the application adaptive to the other electronic terminal, the information for installing the version of the application adaptive to the other electronic terminal includes at least one from among an installation file of the version of the application adaptive to the electronic terminal, an address for downloading the installation file of the version of the application adaptive to the electronic terminal, and identification information of the application.

When a version of the application adaptive to the electronic terminal is different from the version of the application adaptive to the other electronic terminal, the information for installing the version of the application adaptive to the other electronic terminal includes at least one from among an installation file of the version of the application adaptive to the other electronic terminal, an address for downloading the installation file of the version of the application adaptive to the other electronic terminal, and identification information of the application.

The identification information of the application includes at least one from among a name information of the application, version information of the application, and developer information of the application.

The determining whether to install the application in the other electronic terminal includes: determining to install the application in the other electronic terminal when a user operation indicating an installation of the application in the other electronic terminal is detected.

The determining whether to install the application in the other electronic terminal includes: determining whether to install the application in the other electronic terminal according to a preset application association installation setting, wherein the application association installation setting indicates an installation of the application in an associated electronic terminal.

The determining whether to install the application in the other electronic terminal includes determining to install the application in the other electronic terminal when the application is not installed in the other electronic terminal.

The determining whether to install the application in the other electronic terminal includes determining to install the application in the other electronic terminal when a version of the application installed in the other electronic terminal is older than a version of the application installed in the electronic terminal.

Whether the electronic terminal is associated with the other electronic terminal is determined according to association information recorded in the electronic terminal.

Whether the electronic terminal is associated with the other electronic terminal is determined through an account.

Provided is an electronic terminal including: an association determination unit configured to determine whether the electronic terminal is associated with another electronic terminal when installing an application in the electronic terminal; an installation determination unit configured to determine whether to install the application in the other electronic terminal when the electronic terminal is associated with the other electronic terminal; and an information transmission unit configured to transmit information for installing the application to the other electronic terminal when it is determined to install the application in the other electronic terminal.

The information transmission unit is further configured to transmit the information for installing the application to the other electronic terminal through an association channel or another communication channel.

The information transmission unit is further configured to transmit the information for installing the application to the other electronic terminal through the other communication channel when the association channel is unable to be established.

The information transmission unit includes a version determination unit configured to determine a version of the application adaptive to the other electronic terminal, wherein the information transmission unit is further configured to transmit information for installing the version of the application adaptive to the other electronic terminal to the other electronic terminal.

When a version of the application adaptive to the electronic terminal is the same as the version of the application adaptive to the other electronic terminal, the information for installing the version of the application adaptive to the other electronic terminal includes at least one from among an installation file of the version of the application adaptive to the electronic terminal, an address for downloading the installation file of the version of the application adaptive to the electronic terminal, and identification information of the application.

When a version of the application adaptive to the electronic terminal is different from the version of the application adaptive to the other electronic terminal, the information for installing the version of the application adaptive to the other electronic terminal includes at least one from among an installation file of the version of the application adaptive to the other electronic terminal, an address for downloading the installation file of the version of the application adaptive to the other electronic terminal, and identification information of the application.

The identification information of the application includes at least one from among a name information of the application, version information of the application, and developer information of the application.

The installation determination unit is further configured to determine to install the application in the other electronic terminal when a user operation indicating an installation of the application in the other electronic terminal is detected.

The installation determination unit is further configured to determine whether to install the application in the other electronic terminal according to a preset application association installation setting, wherein the application association installation setting indicates an installation of the application in an associated electronic terminal.

The installation determination unit is further configured to determine to install the application in the other electronic terminal when the application is not installed in the other electronic terminal.

The installation determination unit is further configured to determine to install the application in the other electronic terminal when a version of the application installed in the other electronic terminal is older than a version of the application installed in the electronic terminal.

The association determination unit is further configured to determine the other electronic terminal associated with the electronic terminal according to association information recorded in the electronic terminal.

The association determination unit is further configured to determine the other electronic terminal associated with the electronic terminal according through an account.

Provided is an electronic terminal including: an association determination unit configured to determine whether the electronic terminal is associated with another electronic terminal when installing an application in the electronic terminal; an installation determination unit configured to determine whether to install the application in the other electronic terminal when the electronic terminal is associated with the other electronic terminal; and an information transmission unit configured to transmit information for installing the application to the other electronic terminal when it is determined to install the application in the other electronic terminal.

The information transmission unit is further configured to transmit the information for installing the application to the other electronic terminal through an association channel or another communication channel.

The information transmission unit is further configured to transmit the information for installing the application to the other electronic terminal through the other communication channel when the association channel is unable to be established.

The information transmission unit includes a version determination unit configured to determine a version of the application adaptive to the other electronic terminal, wherein the information transmission unit is further configured to transmit information for installing the version of the application adaptive to the other electronic terminal to the other electronic terminal.

When a version of the application adaptive to the electronic terminal is the same as the version of the application adaptive to the other electronic terminal, the information for installing the version of the application adaptive to the other electronic terminal includes at least one from among an installation file of the version of the application adaptive to the electronic terminal, an address for downloading the installation file of the version of the application adaptive to the electronic terminal, and identification information of the application.

When a version of the application adaptive to the electronic terminal is different from the version of the application adaptive to the other electronic terminal, the information for installing the version of the application adaptive to the other electronic terminal includes at least one from among an installation file of the version of the application adaptive to the other electronic terminal, an address for downloading the installation file of the version of the application adaptive to the other electronic terminal, and identification information of the application.

The identification information of the application includes at least one from among a name information of the application, version information of the application, and developer information of the application.

The installation determination unit is further configured to determine to install the application in the other electronic terminal when a user operation indicating an installation of the application in the other electronic terminal is detected.

The installation determination unit is further configured to determine whether to install the application in the other electronic terminal according to a preset application association installation setting, wherein the application association installation setting indicates an installation of the application in an associated electronic terminal.

The installation determination unit is further configured to determine to install the application in the other electronic terminal when the application is not installed in the other electronic terminal.

The installation determination unit is further configured to determine to install the application in the other electronic terminal when a version of the application installed in the other electronic terminal is older than a version of the application installed in the electronic terminal.

The association determination unit is further configured to determine the other electronic terminal associated with the electronic terminal according to association information recorded in the electronic terminal.

The association determination unit is further configured to determine the other electronic terminal associated with the electronic terminal according through an account.

According to example embodiments, when installing an application in an electronic terminal, information for installing the application in another electronic terminal may be transmitted to the other electronic terminal without a user's manual operation.

Provided is a method including: acquiring identification information of a peer terminal; configuring the identification information as a call forwarding number of a local terminal; and transmitting a call forwarding instruction including the identification information to an external device when a call forwarding condition is satisfied.

The acquiring identification information of a peer terminal includes receiving the identification information of the peer terminal from the peer terminal through a short range communication.

A function of either of the local terminal and the peer terminal is controlled through the short range communication by at least one of the local terminal and the peer terminal.

The function includes processing a call to the either of the local terminal and the peer terminal.

When the short range communication connection with the peer terminal is disconnected, the call forwarding condition is determined to be satisfied.

When the short range communication connection with the peer terminal is disconnected, the call forwarding condition is determined based on status of the local terminal.

When the short range communication connection with the peer terminal is disconnected and the local terminal is in a stationary state, the call forwarding condition is determined to be satisfied.

When the local terminal is in the stationary state, the call forwarding condition is determined based on status of the peer terminal.

A status determining request is transmitted to the peer terminal.

A feedback to the status determining request is received from the peer terminal, and the status of the peer terminal is determined according to the feedback of the peer terminal.

The method further includes: transmitting call forwarding instruction information to the peer terminal if the local terminal is in a non-stationary state, in order to indicate that the local terminal functions as a call forwarding object or to indicate that the peer terminal makes a call forwarding to the local terminal.

When the local terminal is in the non-stationary state, status of the local terminal determined.

The call forwarding instruction information is transmitted to the peer terminal based on the determined status of the local terminal.

The call forwarding condition is determined to be satisfied based on the determined status of the local terminal.

When the status of the local terminal does not meet a preset condition, whether status of the peer terminal is determined, and the call forwarding condition is determined to be satisfied based on the determined status of the peer terminal.

The status of the local terminal includes at least one from a signal strength and a remaining battery of the local terminal.

The method further includes releasing the call forwarding configuration of the local terminal and the peer terminal when the call forwarding condition is not satisfied.

Provided is an electronic terminal including: an acquiring unit configured to acquire identification information of a peer terminal; a configuration unit configured to configure the identification information as a call forwarding number of a local terminal; and a transmission unit configured to transmit a call forwarding instruction including the identification information to an external device when a call forwarding condition is satisfied.

The acquiring unit is further configured to receive the identification information of the peer terminal from the peer terminal through a short range communication.

A function of either of the local terminal and the peer terminal is controlled through the short range communication by at least one of the local terminal and the peer terminal.

The function includes processing a call to the either of the local terminal and the peer terminal.

The electronic terminal further includes a first determination unit configured to determine that the call forwarding condition is satisfied when the short range communication connection with the peer terminal is disconnected.

The electronic terminal further includes a first detection unit configured to determine status of the local terminal when the short range communication connection with the peer terminal is disconnected, and the determination unit is further configured to determine that the call forwarding condition is satisfied based on the determined status of the local terminal.

The first determination unit is further configured to determine whether the local terminal is in a stationary state when the short range communication connection with the peer terminal is disconnected, and determine that the call forwarding condition is satisfied if the local terminal is in the stationary state.

The electronic terminal further includes a first confirmation unit configured to determine status of the peer terminal if the local terminal is in the stationary state.

The first determination unit is further configured to determine that the call forwarding condition is satisfied based on the status of the peer terminal.

The first confirmation unit includes a transmission module configured to transmit a status determining request to the peer terminal; a reception module configured to receive a feedback to the status determining request from the peer terminal; and a determination module configured to determine the status of the peer terminal according to the feedback from the peer terminal.

The transmission unit is further configured to transmit call forwarding instruction information to the peer terminal to indicate that the local terminal functions as a call forwarding object or to indicate that the peer terminal make a call forwarding to the local terminal, if the local terminal is in a non-stationary state.

The electronic terminal further includes a second detection unit configured to determine the status of the local terminal when the local terminal is in the non-stationary state, and the transmission unit is further configured to transmit the call forwarding instruction information to the peer terminal based on the status of the local terminal.

The electronic terminal further includes: a third detection unit configured to determine status of the local terminal; and a second determination unit configured to determine that the call forwarding condition is satisfied based on the determined status of the local terminal.

The electronic terminal further includes a second confirmation unit configured to determine status of the peer terminal when the status of the local terminal does not meet a preset condition, and the second determination unit is further configured to determine that the call forwarding condition is satisfied based on the status of the peer terminal.

The status of the local terminal includes at least one from a signal strength and a remaining battery of the local terminal.

The electronic terminal further includes a release unit configured to release the call forwarding configuration of the local terminal and the peer terminal when the call forwarding condition is not satisfied.

According to example embodiments, identification information of a peer terminal is acquired, the identification information is set as a call forwarding number of the local terminal, and then a call forwarding instruction including the identification information is transmitted to an external device. According to example embodiments, a call may be forwarded between devices based on status of the devices.

DESCRIPTION OF DRAWINGS

FIG. 7 illustrates a flowchart of a searching method according to an example embodiment.

FIG. 23 illustrates an example electronic device according to an example embodiment.

MODE OF INVENTION

Figure 1:
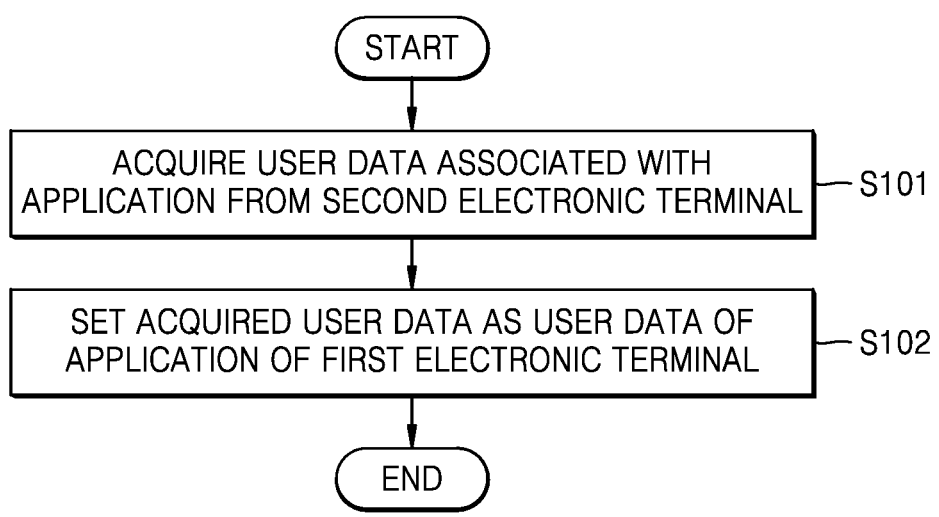
FIG. 1 illustrates a flowchart of a data acquisition method according to an example embodiment.

Advantages and features of one or more embodiments in the present disclosure and methods of accomplishing the same may be understood more readily by reference to the following detailed description of the embodiments and the accompanying drawings. Reference will now be made in detail to embodiments, examples of which are illustrated in the accompanying drawings. In this regard, the present embodiments may have different forms and should not be construed as being limited to the descriptions set forth herein. However, the exemplary embodiments may be realized in different forms, and are not limited to the embodiments in the present disclosure. In the accompanying drawings, like reference numerals refer to like elements throughout.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

As used herein, the singular forms "a", "an" and "the" are intended to include the plural forms as well, unless the context clearly indicates otherwise. It should be understood that the terms "comprises," "comprising," "including," and "having" are inclusive and therefore specify the presence of stated features or components, but do not preclude the presence or addition of one or more other features or components. Numbers described herein are examples for helping understanding, and embodiment should not be limited to the numbers.

In the present disclosure, the term such as " . . . unit" or " . . . module" should be understood as a unit in which at least one function or operation is processed. A component termed as " . . . unit" or " . . . module" may be embodied as hardware, software, or a combination of hardware and software.

It should be understood that, although the terms "first," "second," etc. may be used herein to describe various elements, and these elements should not be limited by these terms. These terms are used to distinguish one element from another. For example, a first element may be termed a second element within the technical scope of an exemplary embodiment.

Terms used herein will now be briefly described and then one or more exemplary embodiments will be described in detail.

In the present disclosure, an electronic device may be a smartphone, tablet computer, mobile phone, personal digital assistant (PDA), media player, portable multimedia player (PMP), e-book terminal, digital broadcasting terminal, electronic bulletin board, personal computer (PC), laptop computer, micro-server, global positioning system (GPS) device, navigation device, kiosk, MP3 player, analog television (TV), digital TV, three-dimensional (3D) TV, smart TV, light-emitting diode (LED) TV, organic light-emitting diode (OLED) TV, plasma TV, monitor, curved TV including screen having a fixed curvature, flexible TV including a screen having a fixed curvature, bended TV including a screen having a fixed curvature, curvature-variable TV where a curvature of a screen is adjustable according to a received user input, digital camera, wearable device and other mobile device capable of being worn on a body of a user, and non-mobile computing device, but is not limited thereto.

In the present disclosure, an electronic device may be referred to as a terminal, electronic terminal, user terminal, local terminal, peer terminal, mobile terminal, apparatus, electronic apparatus, user apparatus, local apparatus, peer apparatus, mobile apparatus, device, electronic device, user device, local device, peer device, and mobile device.

In the present disclosure, a wearable device may be a watch, bracelet, ring, glasses, and hair band, but is not limited thereto.

In the present disclosure, content may be referred to as an object that is visualized based on data, or the data itself. The content may include text and background. The content may include an image and video. The content may be distributed or shared via networks in an electronic form. The content may be a web-based content, and displayed by an internet browser. The content may be application-based content, and displayed by an application. The content is not limited thereto, and may be produced and displayed in various ways. Furthermore, the content may include a graphic user interface (GUI) for interaction with a user, and details of the content may be displayed in the GUI. A menu for receiving a user input may be displayed.

In the present disclosure, the electronic device may be a smartphone.

A first electronic terminal and a second electronic terminal may be smartphones, smart-watches, personal computers, panel computers, game consoles, digital media players, or any type of electronic devices in which an application is installed.

A data acquisition method and a data providing method according to example embodiments are described by referring to FIGS. 1, 2, 3, 4, 5, and 6. The second electronic terminal may be associated with the first electronic terminal. The same application may be installed in the first electronic terminal and the second electronic terminal. For example, in an association of two electronic terminals, one electronic terminal may have permission to execute and control a certain function of the other electronic terminal.

For example, when a smartphone and a smart-watch are associated with each other, the smart-watch may receive and respond to a phone call made to the smartphone, or receive and reply to an email and text message destined for the smartphone. The smartphone may push the email and text message to the smart-watch, or forward a call to the smart-watch.

The second electronic terminal associated with the first electronic terminal may be determined according to association information recorded in the first electronic terminal. The association information recorded in an electronic terminal may indicate whether the electronic terminal is associated with another electronic terminal, or with which terminal the electronic terminal is associated with.

An electronic terminal may be associated with another electronic terminal based on a user's operation. For example, the user may allow the other electronic terminal to be associated with the electronic terminal by a certain application, or by scanning an image such as a two dimensional (2D) code.

The electronic terminal may be associated with the other electronic terminal automatically. For example, when the electronic terminal is a smartphone which is capable of pairing with a smart-watch such as Samsung Galaxy Gear, and the smartphone may be paired with the smart-watch according to the user's operation to perform an association of the smartphone and smart-watch.

In an example embodiment, the second electronic terminal associated with the first electronic terminal may be determined based on an account. For example, when a user uses two electronic terminals with the same account, it may be determined that the two electronic terminals are associated with each other. For example, when the same application is used in two electronic terminals with the same account for a certain time period, it may be determined that the two electronic terminals are associated with each other.

However, a method of determining the second electronic terminal associated with the first electronic terminal is not limited thereto, and may be implemented by other methods.

An association channel may be a short range communication channel such as Wi-Fi, ZigBee, near field communication (NFC), and Bluetooth. When the first and second electronic terminals are associated with each other, the first and second electronic terminals may communicate with each other through the association channel when the first and second electronic terminals are in a communication range of the association channel. When the association channel is unable to be established, for example, the first and second electronic terminals are out of a communication range of the association channel, the first and second electronic terminals may communicate with each other through another communication channel such as a mobile communication channel or a wired communication channel.

The association channel is not limited to the short range communication channel, and may further include a long range communication channel. When the first and second electronic terminals are out of a communication range of the short range communication channel, the first and second electronic terminals may communicate with each other through the long range communication channel.

FIG. 1 illustrates a flowchart of a data acquisition method according to an example embodiment.

The data acquisition method may be performed by the first electronic terminal, and may be implemented by a computer program. For example, the data acquisition method may be performed by an application installed in the first electronic terminal to acquire data. For example, the data acquisition method may be performed by a function program in an operation system of the first electronic terminal.

In operation S101, the first electronic terminal may acquire user data associated with an application program from the second electronic terminal. Here, the application program may be an application program which is to be installed or is installed in the first electronic terminal, and the same application program may be installed in the second electronic terminal.

The user data may include personalized data generated by the application program. The personalized data may be generated by using the application program with an account of a user. The personalized data may be generated by a user directly using the application program.

For example, when a user uses an input method (for example, a certain Chinese Pinyin input method) in an electronic terminal, he may not be signed in with his account. Accordingly, user data associated with the input method may be generated according to the user's input to the electronic terminal, and a personalized lexicon may be generated by recording the user's input habit.

The personalized data may include at least one from among input history data, browsing history data, and operation step history data. The browsing history data may be generated based on the user's browsing through the application program. The operation step history data may be generated based on the user's operation steps performed in the application program. For example, when the user moves from a current page to a next page or a previous page in the application program, the operation step history data may be generated based on an operation step of moving from a current page to a next page or to a previous page. The input history data may be generated based on the user's input to an input box of the application program. For example, the input history data may be generated based on characters input by the user, and selecting of an option by the user.

The input history data may include search history data. The search history data may be generated based on the user's searches performed in the application program.

For example, when the application program is regarding shopping, the search history data may be generated based on products found for or viewed by the user in the application program. Here, the browsing history data may be generated based on a webpage viewed by the user in the application program, and the operation step history data may be generated based on an operation of moving from a current page (for example, a shopping cart page) to a next page (for example, a payment page) in the application program.

The first electronic terminal may acquire the user data associated with the application program from the second electronic terminal according to the user's instruction, or may acquire the user data associated with the application program automatically from the second electronic terminal.

When the first electronic terminal acquires the user data associated with the application program automatically from the second electronic terminal, the first electronic terminal may actively request from the second electronic terminal the user data associated with the application program. The first electronic terminal may passively receive the user data associated with the application program from the second electronic terminal.

In an example embodiment, operation S101 may be performed when installing or executing the application program in the first electronic terminal. For example, when installing or executing the application program in the first electronic terminal, the first electronic terminal may request from the second electronic terminal the user data associated with the application program.

In an example embodiment, the user data associated with the application program may be acquired from the second electronic terminal through an association channel or another communication channel. In an example embodiment, the user data associated with the application program may be acquired from the second electronic terminal through the other communication channel when the association channel is unable to be established.

In operation S102, the first electronic terminal may set the acquired user data as user data of the application program of the first electronic terminal.

Figure 2:
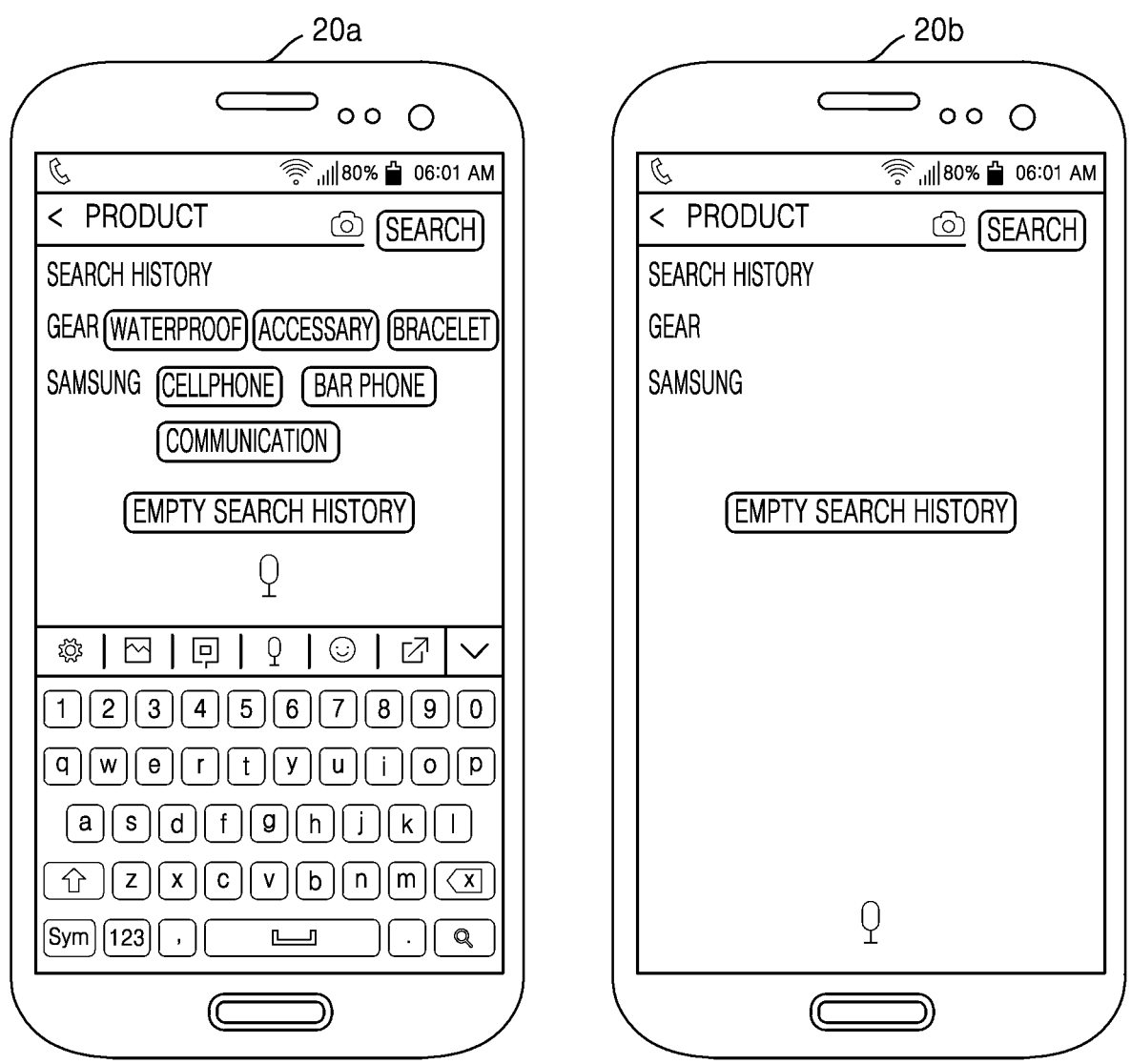
FIGS. 2 and 3 illustrate an example method of setting acquired user data as user data in a same application program, according to an example embodiment.
Figure 3:
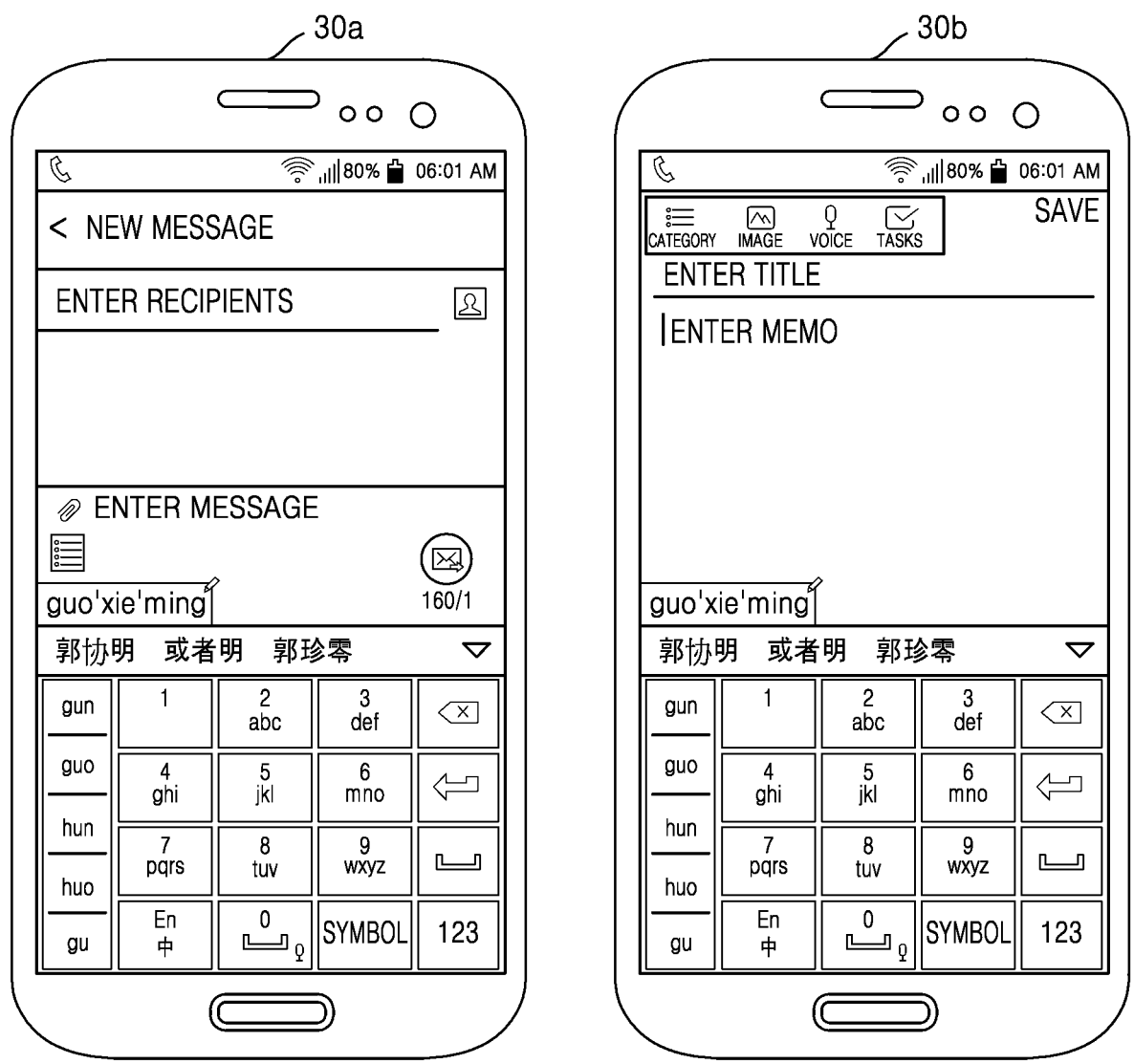

FIGS. 2 and 3 illustrate an example method of setting acquired user data as user data in a same application program, according to an example embodiment.

Referring to FIG. 2, a first electronic terminal 20b and a second electronic terminal 20a may be associated with each other, and a first application program executed in the first electronic terminal 20b and a second application program executed in the second electronic terminal 20a may be the same application program, but is not limited thereto. Here, the first electronic terminal 20b may set user data which is acquired from the second electronic terminal 20a and associated with the same application program as user data of the same application program in the first electronic terminal 20b.

Referring to FIG. 2, when the first application program is executed in the first electronic terminal 20b, search history of the user in the same application program, which is the second application program, in the second electronic terminal 20a may be displayed.

Referring to FIG. 3, a first electronic terminal 30b and a second electronic terminal 30a may be associated with each other, and a first input method in the first electronic terminal 30b and a second input method in the second electronic terminal 30a may be the same input method. Here, the first electronic terminal 30b may set user data which is acquired from the second electronic terminal 30a and associated with the same input method as user data of the input method in the first electronic terminal 30b.

Referring to FIG. 3, when the first input method is executed and used in the first electronic terminal 30b, a user lexicon generated by the same input method, which is the second input method, in the second electronic terminal may be acquired and set as a user lexicon of the first input method in the first electronic terminal 30b.

In an example embodiment, the data acquisition method may further include a search process.

Figure 4:
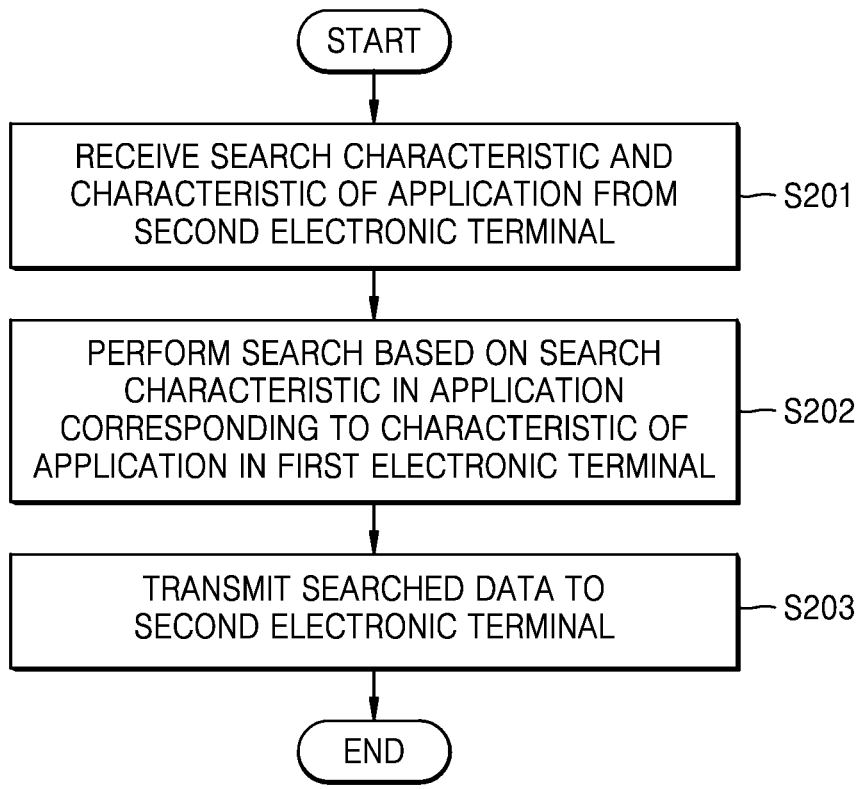
FIG. 4 illustrates a flowchart of a searching method according to an example embodiment.

FIG. 4 illustrates a flowchart of a searching method according to an example embodiment.

Referring to FIG. 4, in operation S201, the first electronic terminal may receive a search characteristic and a characteristic of the application program from the second electronic terminal. The search characteristic may include an input search keyword and a selected search parameter, but is not limited thereto. The characteristic of the application program may include a name of the application program, and a version number of the application program, but is not limited thereto.

In operation S202, the first electronic terminal may perform the search according to the search characteristic in a search application program which is indicated by the characteristic of the application program.

In operation S203, the first electronic terminal may transmit found data to the second electronic terminal. In an example embodiment, the data acquisition method may further include operations of, when logging in to the first application program in the first electronic terminal with an account, determining a usage situation of the account in the same application program, which is the second application program, in the second electronic terminal, and when it is determined that the usage situation meets a predetermined condition, logging in to the first application program in the first electronic terminal with the account without performing additional authentication in the second electronic terminal.

When logging in to an application program in the first electronic terminal with an account, that is, when the first electronic terminal tries to access a certain web resource in the Internet, the first electronic terminal may be requested to perform an authentication operation in the application program. When the second electronic terminal is determined as a subject performing the authentication operation of the first electronic terminal, an authenticatee change request including identification information of the second electronic terminal may be transmitted to a server which has requested the authentication operation. The first electronic terminal may transmit to the server the authenticatee change request.

The server may refer to an authentication status of the second electronic terminal which is associated with the first electronic terminal in response to the authenticatee change request. Here, the authentication status of the second electronic terminal may include the authentication status of the second electronic terminal with regard to the web resource accessed by the first electronic terminal.

When the authentication status of the second electronic terminal with regard to the web resource accessed by the first electronic terminal meets a predetermined standard such as the number of authentications, a duration of each authentication, and the number of failed authentications of the second electronic terminal with regard to the web resource, the first electronic terminal may be authenticated automatically without additional authentication, and examples of the predetermined standard are not limited thereto.

In an example embodiment, user data associated with an application program may be acquired from the second electronic terminal to determine a usage situation of an account used in the application program. For example, when logging in to a message application program in the first electronic terminal with an account, the usage situation of the account in the second electronic terminal may be determined. When the same message application program in the second electronic terminal is logged into with the account more than a certain number of times, the account may be used to login to the message application program in the first electronic terminal without additional authentication in the second electronic terminal.

Figure 5:
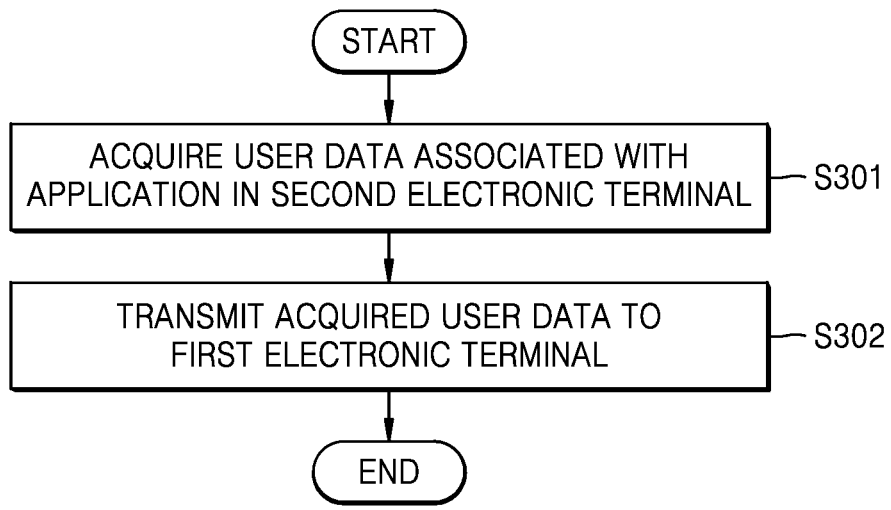
FIG. 5 illustrates a flowchart of a data providing method according to an example embodiment.

FIG. 5 illustrates a flowchart of a data providing method according to an example embodiment.

The data providing method may be performed by the second electronic terminal, and may be implemented by a computer program. For example, the data providing method may be performed by a function program in an operation system of the second electronic terminal.

In operation S301, the second electronic terminal may acquire user data associated with an application program in the second electronic terminal. Here, the application program may be an application program which is to be installed or is installed in the first electronic terminal, and the same application program may be installed in the second electronic terminal.

The user data may include personalized data generated by the application program. The personalized data may be generated by using the application program with an account of a user. The user data may be the personalized data generated by the user directly using the application program.

For example, when a user uses an input method (for example, a certain Chinese Pinyin input method) in an electronic terminal, he may not be signed in with his account. Accordingly, user data associated with the input method may be generated according to the user's input to the electronic terminal, and a personalized lexicon may be generated by recording the user's input habit.

The personalized data may include at least one from among input history data, browsing history data, and operation step history data. The browsing history data may be generated based on the user's browsing through the application program. The operation step history data may be generated based on the user's operation steps performed in the application program. For example, when the user moves from a current page to a next page or to a previous page in the application program, the operation step history data may be generated based on an operation step of moving from a current page to a next page or a previous page. The input history data may be generated based on the user's input to an input box of the application program. For example, the input history data may be generated based on characters input by the user, and selecting of an option by the user.

The input history data may include search history data. The search history data may be generated based on the user's searches performed in the application program.

When the first electronic terminal acquires the user data associated with the application program automatically from the second electronic terminal, the first electronic terminal may actively request from the second electronic terminal the user data associated with the application program. The first electronic terminal may passively receive the user data associated with the application program from the second electronic terminal.

In an example embodiment, whether there is an update of the user data associated with the application program may be detected. When there is the update of the user data, the second electronic terminal may acquire the user data. The user data associated with the application program may occur when executing the application program. Therefore, upon executing the application program, whether there is the update of the user data associated with the application program may be detected. In an example embodiment, whether there is the update of the user data associated with the application program may be detected when an establishment of the association channel is detected.

In operation S302, the second electronic terminal may transmit the acquired user data to the first electronic terminal.

The user data may be transmitted to the first electronic terminal through an association channel or another communication channel. In an example embodiment, the user data may be transmitted to the first electronic terminal through the other communication channel when the association channel is unable to be established.

In an example embodiment, the data providing method may further include a search process.

Figure 6:
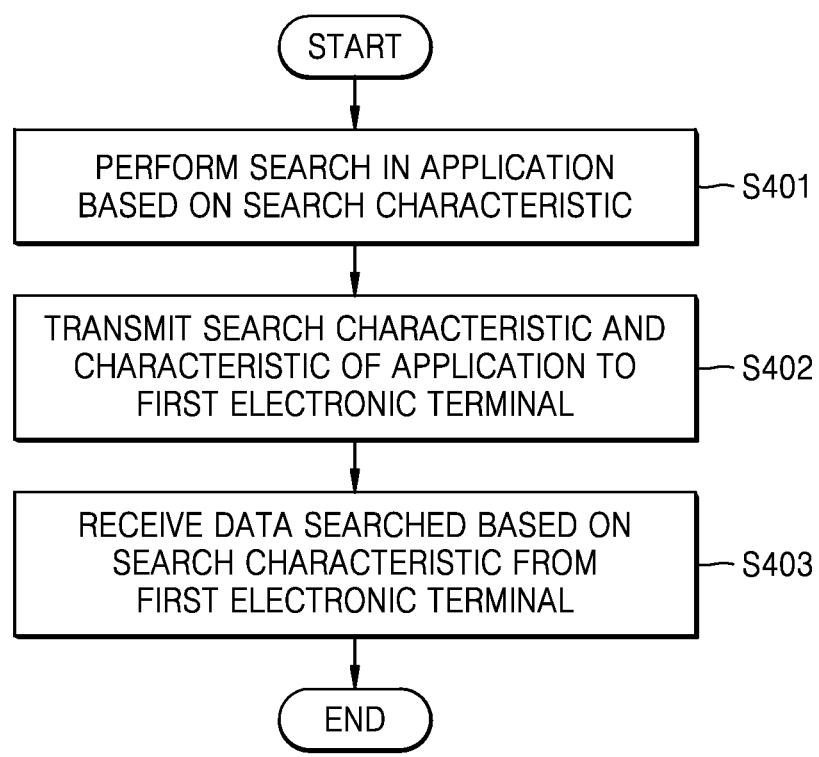
FIG. 6 illustrates a flowchart of a searching method according to an example embodiment.

FIG. 6 illustrates a flowchart of a searching method according to an example embodiment.

Referring to FIG. 6, in operation S401, the second electronic terminal may perform a search via an application program according to a search characteristic.

In operation S402, the second electronic terminal may transmit the search characteristic and a characteristic of the application program to the first electronic terminal.

In operation S403, the second electronic terminal may receive from the first electronic terminal data found by the same application program in the first electronic terminal according to the transmitted search characteristic. That is, the first electronic terminal may perform a search by the same application program according to the search characteristic to transmit found data to the second electronic terminal.

A searching method according to example embodiments is described below by referring to FIGS. 7, 8A, 8B, and 9.

FIG. 7 illustrates a flowchart of a searching method according to an example embodiment.

The searching method may be performed by the second electronic terminal, and may be implemented by a computer program. For example, the searching method may be performed by an application program which is installed in the second electronic terminal. For example, the searching method may be performed by a function program in an operation system of the second electronic terminal.

Referring to FIG. 7, in operation S501, the second electronic terminal may perform a search by an application program in the second electronic terminal according to a search characteristic. The search characteristic may include an input search keyword and a search parameter selected, but is not limited thereto.

The application program may perform a search in the second electronic terminal according to the search characteristic. In an example embodiment, the second electronic terminal may perform a search through one or more application programs in the second electronic terminal according to the search characteristic, for example, the second electronic terminal may search for an image in an image browsing application program according to the search characteristic.

In operation S502, the second electronic terminal may determine the first electronic terminal associated with the second electronic terminal.

The first electronic terminal associated with the second electronic terminal may be determined according to association information recorded in the second electronic terminal. The association information recorded in an electronic terminal may indicate whether the electronic terminal is associated with another electronic terminal, or with which terminal the electronic terminal is associated with. An electronic terminal may be associated with another electronic terminal based on a user's operation.

For example, the user may allow the other electronic terminal to be associated with the electronic terminal by a certain application, or by scanning an image such as 2D code.

The electronic terminal may be associated with the other electronic terminal automatically. For example, when the electronic terminal is a smartphone which is capable of pairing with a smart-watch such as Samsung Galaxy Gear, and the smartphone may be paired with the smart-watch according to the user's operation to perform an association of the smartphone and smart-watch.

The first electronic terminal associated with the second electronic terminal may be determined based on an account. For example, when a user uses two electronic terminals with the same account, the two electronic terminals may be associated with each other. For example, when the same application is used in two electronic terminals with the same account for a certain time period, the two electronic terminals may be associated with each other.

However, a method of determining the second electronic terminal associated with the first electronic terminal is not limited thereto, and may be implemented by other methods.

An association channel may be a short range communication channel such as Wi-Fi, ZigBee, NFC, and Bluetooth. When the first and second electronic terminals are associated with each other, the first and second electronic terminals may communicate with each other through the association channel when the first and second electronic terminals are in a communication range of the association channel. When the association channel is unable to be established, for example, the first and second electronic terminals are out of a communication range of the association channel, the first and second electronic terminals may communicate with each other through other communication channel such as a mobile communication channel and a wired communication channel.

The association channel is not limited to the short range communication channel, and may further include a long range communication channel. When the first and second electronic terminals are out of a communication range of the short range communication channel, the first and second electronic terminals may communicate with each other through the long range communication channel.

In operation S503, the second electronic terminal may transmit the search characteristic and a characteristic of the application program to the first electronic terminal, and the first electronic terminal may perform a search in the same application program according to the search characteristic.

The characteristic of the application program may include a name of the application program, and a version number of the application program, but is not limited thereto.

In an example embodiment, when the search characteristic is for searching an image or a video, whether the first electronic terminal is provided with a camera may be determined. When it is determined that the first electronic terminal is provided with a camera, the search characteristic and the characteristic of the application program may be transmitted to the first electronic terminal.

In operation S504, the second electronic terminal may receive from the first electronic terminal data found by the same application program in the first electronic terminal according to the search characteristic.

The search characteristic and the characteristic of the application program may be transmitted to the first electronic terminal through an association channel or another communication channel Data found in the first electronic terminal according to the search characteristic by a search application program which is indicated by the characteristic of the application program may be received from the first electronic terminal through the association channel or the other communication channel. In an example embodiment, the search characteristic and the characteristic of the application program may be transmitted to the first electronic terminal through the other communication channel when the association channel is unable to be established. Data found in the first electronic terminal according to the search characteristic by a search application program which is indicated by the characteristic of the application program may be received from the first electronic terminal through the other communication channel when the association channel is unable to be established.

In an example embodiment, the searching method may further include an operation of displaying in the second electronic terminal the data found by the first electronic terminal to be distinguished from data found by the second electronic terminal.

For example, when displaying the search results in the second electronic terminal, data respectively found by the first electronic terminal and the second electronic terminal may be marked differently.

In an example embodiment, the searching method of may further include an operation of transmitting a search history record to the first electronic terminal such that the first electronic terminal may set the transmitted search history record as its search history record in a corresponding application program.

Figure 8A:
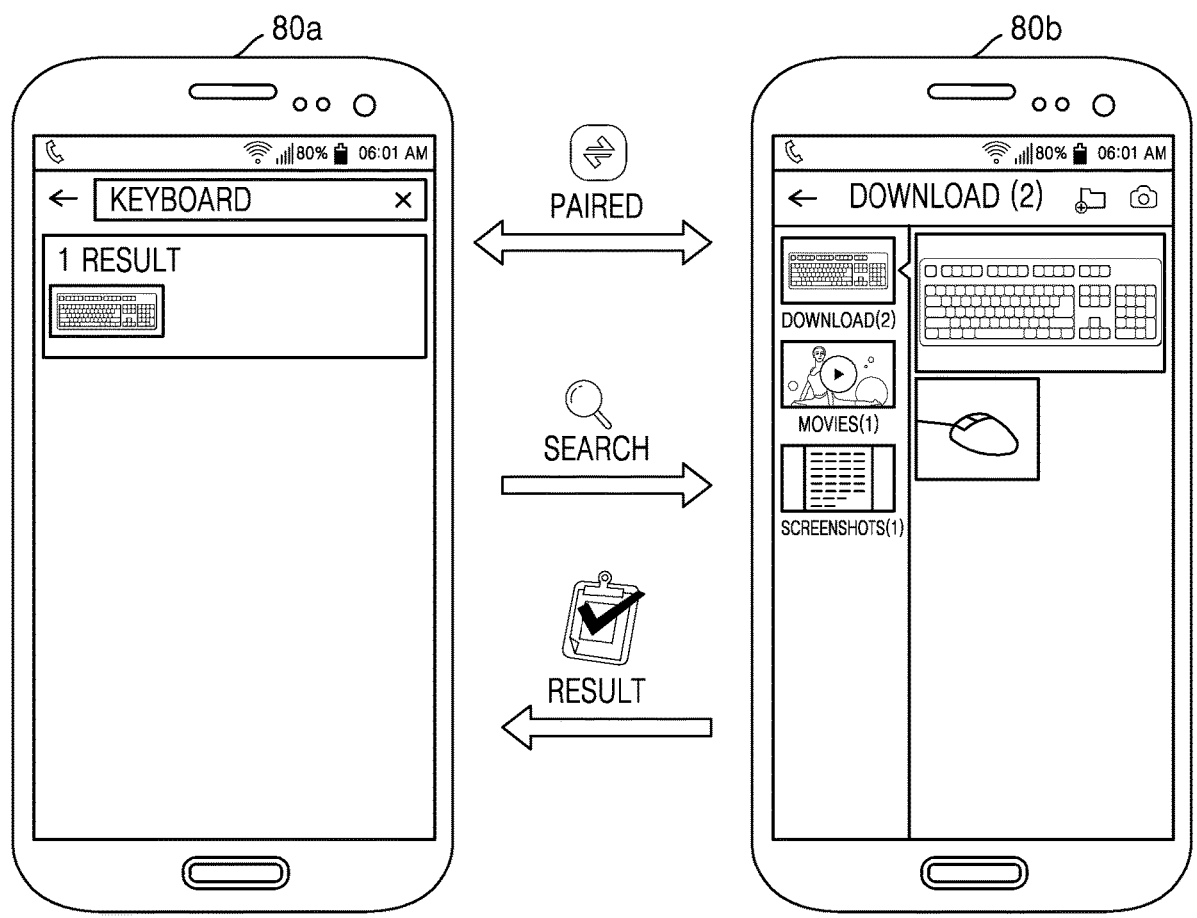
FIG. 8A illustrates an example search according to an example embodiment.

FIG. 8A illustrates an example search according to an example embodiment.

Referring to FIG. 8A, a first electronic terminal 80b and a second electronic terminal 80a may be associated with each other, and a first application program executed in the first electronic terminal 80b and a second application program executed in the second electronic terminal 80a may be the same application program, but is not limited thereto.

As illustrated in FIG. 8, when a user inputs a search characteristic in the application program in the second electronic terminal 80a, a search may be performed simultaneously in a corresponding application program in the first electronic terminal 80b according to the search characteristic. A result of the search, for example, a found image may be received from the first electronic terminal 80b and be displayed on the second electronic terminal 80a.

According to an example embodiment, when performing a search in an electronic terminal, a search can also be performed simultaneously in another electronic terminal associated with the electronic terminal. Thus, a search may be performed in an associated electronic terminal without user's input for searching in the associated electronic terminal.

Figure 8B:
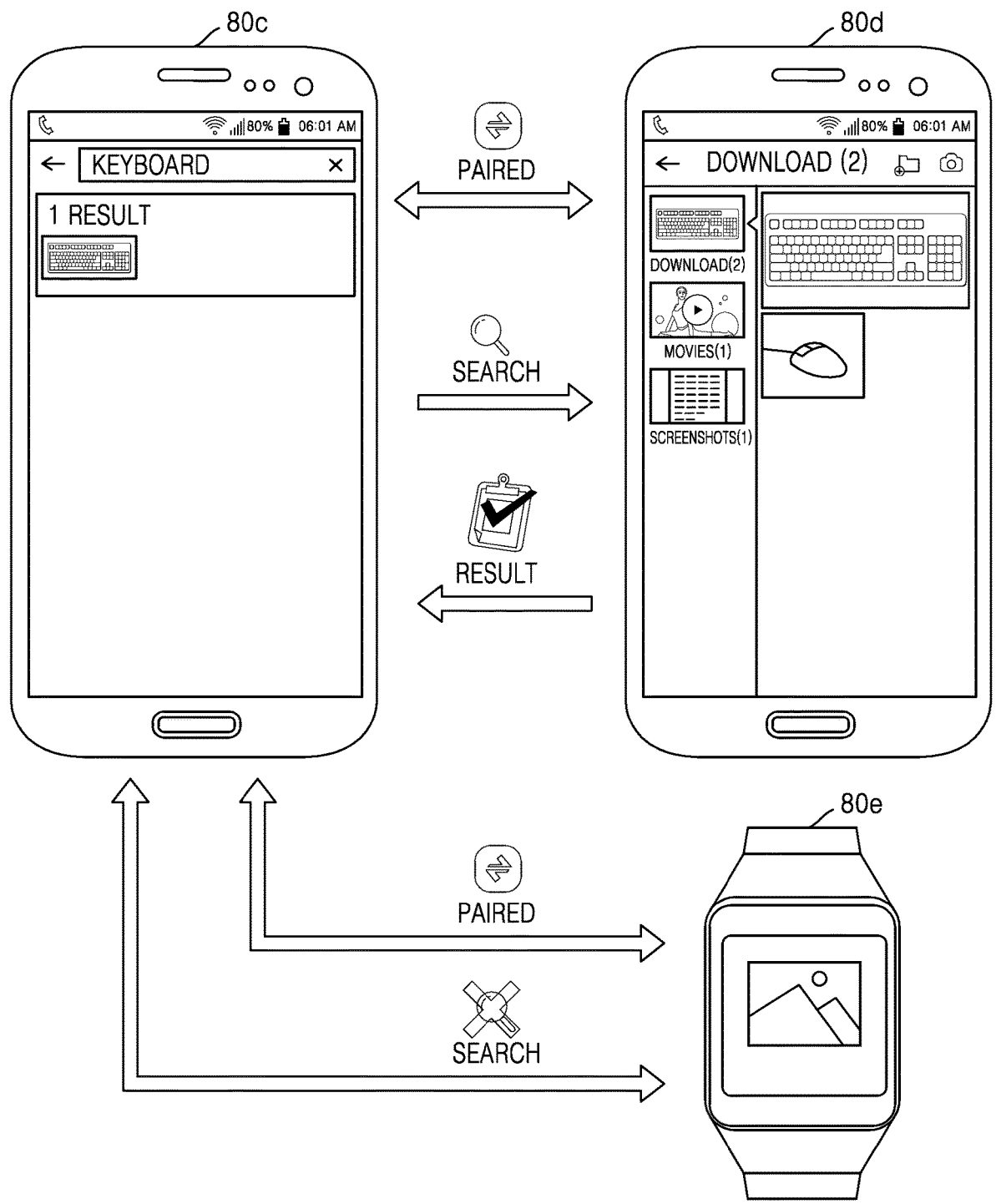
FIG. 8B illustrates an example search according to an example embodiment.

FIG. 8B illustrates an example search according to an example embodiment.

Referring to FIG. 8B, a first electronic terminal 80d and a second electronic terminal 80c may be associated with each other, and a first wearable terminal 80e and the second electronic terminal 80c may be associated with each other, and a first application program executed in the first electronic terminal 80d and a second application program executed in the second electronic terminal 80a may be the same application program, but is not limited thereto.

When the same application program is not installed in the first wearable terminal 80e, a search may not performed in the first wearable terminal 80e when a search characteristic is input to the second electronic terminal 80c. Therefore, resources of the first wearable terminal 80e may be conserved In an example embodiment, when a search category or a search class is selected or defined with regard to a search characteristic input to the second electronic terminal 80c, an associated electronic terminal which does not have a corresponding function regarding the selected search category or search class may not perform a search.

For example, when the search category or search class with regard to the search characteristic is selected as an image category or image class, the corresponding function may be a capturing function. Accordingly, referring to FIG. 8B, when the first wearable terminal 80e does not have the capturing function, the first wearable terminal 80e may not perform a search.

In an example embodiment, when a search category or a search class is selected or defined with regard to a search characteristic input to the second electronic terminal 80c, the search characteristic may be transmitted to an associated electronic terminal which has a corresponding function regarding the selected search category or search class may not perform a search.

Figure 9:
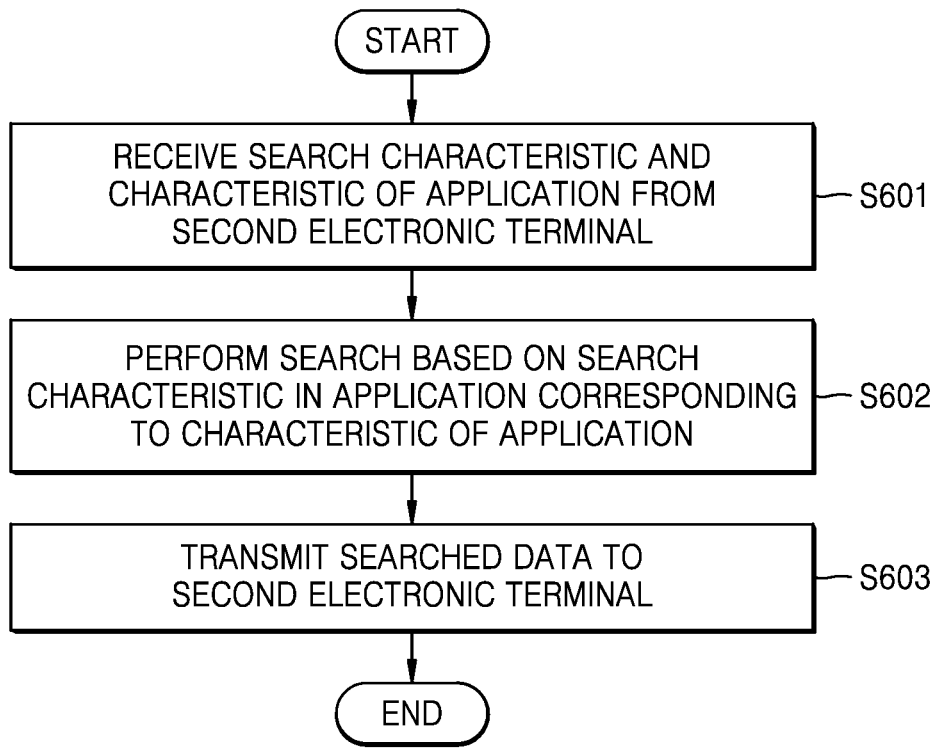
FIG. 9 illustrates a flowchart of a searching method according to an example embodiment.

FIG. 9 illustrates a flowchart of a searching method according to an example embodiment.

The searching method may be performed by the first electronic terminal, and may be implemented by a computer program. For example, the searching method may be performed by an application program which is installed in the first electronic terminal. For example, the searching method may be performed by a function program in an operation system of the first electronic terminal. Here, the first electronic terminal may be associated with the second electronic terminal, and perform a search in the first electronic terminal according to the search characteristic.

In operation S601, the first electronic terminal may receive a search characteristic and a characteristic of an application program from the second electronic terminal. The search characteristic may include an input search keyword and a search parameter selected, but is not limited thereto. The characteristic of the application program may include a name of the application program, and a version number of the application program, but is not limited thereto.

In operation S602, the first electronic terminal may perform a search according to the search characteristic in a search application program corresponding to the characteristic of the application program.

In an example embodiment, when the search characteristic is for searching an image or a video, whether the first electronic terminal is provided with a camera may be determined. When the first electronic terminal is not provided with a camera, operation S602 may not be performed and the first electronic terminal may notify the second electronic terminal.

In operation S603, the first electronic terminal may transmit found data to the second electronic terminal.

The search characteristic and the characteristic of the application program may be received from the second electronic terminal through an association channel or another communication channel. The found data may be transmitted to the second electronic terminal through an association channel or another communication channel.

In an example embodiment, the search characteristic and the characteristic of the application program may be received from the second electronic terminal through the other communication channel when the association channel is unable to be established. In an example embodiment, the found data may be transmitted to the second electronic terminal through the other communication channel when the association channel is unable to be established.

In an example embodiment, the searching method may further include an operation of storing the received search characteristic as a search history record of the corresponding application program in the first electronic terminal.

The first electronic terminal and the second electronic terminal according to exemplary embodiments are described by referring to FIGS. 10, 11, 12, and 13.

A unit included in the first electronic terminal and the second electronic terminal may be implemented by a dedicated device (for example, a sensor device), but is not limited thereto. For example, the unit may be implemented by a universal hardware processor, such as a digital signal processor, and a field programmable gate array, but is not limited thereto. The unit may be implemented by a dedicated hardware processor such as a dedicated chip, and may be implemented by a computer program. For example, the unit may be implemented as a module in an application program installed in the electronic terminal, or may be implemented as a function program of an operation system of the electronic terminal.

Figure 10:
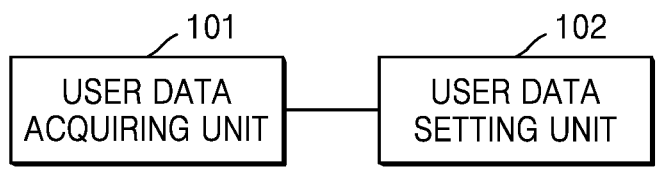
FIG. 10 illustrates a block diagram of a first electronic terminal for acquiring data, according to an example embodiment.

FIG. 10 illustrates a block diagram of a first electronic terminal for acquiring data according to an example embodiment.

Here, the second electronic terminal may be associated with the first electronic terminal. The same application may be installed in the first electronic terminal and the second electronic terminal.

Referring to FIG. 10, the first electronic terminal may include a user data acquiring unit 101 and a user data setting unit 102. In an example embodiment, the first electronic terminal may further include another component. For example, the first electronic terminal may further include a component as a mobile communication terminal, a panel computer, a game console, and a digital multi-media player, but is not limited thereto.

The user data acquiring unit 101 may be configured to acquire user data associated with an application program from the second electronic terminal. Here, the same application may be installed in the first electronic terminal and the second electronic terminal.

The user data may include personalized data generated by the application program. The personalized data may be generated by using the application program with an account of a user.

The user data may be the personalized data generated by the user directly using the application program.

For example, when a user uses an input method (for example, a certain Chinese Pinyin input method) in an electronic terminal, he may not be signed in with his account. Accordingly, user data associated with the input method may be generated according to the user's input to the electronic terminal, and a personalized lexicon may be generated by recording the user's input habit.

For example, the personalized data may include at least one from among input history data, browsing history data, and operation step history data. The browsing history data may be generated based on the user's browsing through the application program. The operation step history data may be generated based on the user's operation steps performed in the application program. For example, when the user moves from a current page to a next page or a previous page in the application program, the operation step history data may be generated based on an operation step of moving from a current page to a next page or a previous page. The input history data may be generated based on the user's input to an input box of the application program. For example, the input history data may be generated based on characters input by the user, and selecting an option by the user. The input history data may include search history data. The search history data may be generated based on the user's searches performed in the application program.

The user data acquiring unit 101 may acquire the user data associated with the application program from the second electronic terminal according to the user's operation. The user data acquiring unit 101 may acquire the user data associated with the application program automatically from the second electronic terminal. When acquiring the user data associated with the application program automatically from the second electronic terminal, the user data acquiring unit 101 may actively request from the second electronic terminal the user data associated with the application program. The first electronic terminal may passively receive the user data associated with the application program from the second electronic terminal.

For example, when installing or executing the application program in the first electronic terminal, the user data acquiring unit 101 may acquire from the second electronic terminal the user data associated with the application program.

In an example embodiment, the user data acquiring unit 101 may acquire the user data associated with the application program from the second electronic terminal through an association channel or another communication channel. In an example embodiment, the user data acquiring unit 101 may acquire the user data associated with the application program from the second electronic terminal through the association channel when the association channel is established. In an example embodiment, the user data acquiring unit 101 may acquire the user data associated with the application program from the second electronic terminal through the other communication channel when the association channel is unable to be established.

The user data setting unit 102 may be configured to set the acquired user data as user data of the application program in the first electronic terminal.

In an example embodiment, the first electronic terminal may further include an association determining unit (now shown).

The association determining unit may determine the second electronic terminal associated with the first electronic terminal according to association information recorded in the first electronic terminal. The association information recorded in an electronic terminal may indicate whether the electronic terminal is associated with another electronic terminal, or with which terminal the electronic terminal is associated with.

An electronic terminal may be associated with another electronic terminal based on a user's operation. For example, the user may allow the other electronic terminal to be associated with the electronic terminal by a certain application, or by scanning an image such as 2D code.

The electronic terminal may be associated with the other electronic terminal automatically. For example, when the electronic terminal is a smartphone which is capable of pairing with a smart-watch such as Samsung Galaxy Gear, and the smartphone may be paired with the smart-watch according to the user's operation to perform an association of the smartphone and smart-watch.

Pairing status denotes status where a plurality of electronic terminals are connected through a communication channel so data is exchanged therebetween.

The association determining unit may determine the second electronic terminal associated with the first electronic terminal through an account. For example, when a user uses two electronic terminals with the same account, it may be determined by the association determining unit that the two electronic terminals are associated with each other. For example, when the same application is used in two electronic terminals with the same account for a certain time period, it may be determined by the association determining unit that the two electronic terminals are associated with each other.

In an example embodiment, the first electronic terminal may further include a receiving unit, a searching unit, and a transmitting unit.

The receiving unit may be configured to receive a search characteristic and a characteristic of an application program from the second electronic terminal. The search characteristic may include an input search keyword and a search parameter selected, but is not limited thereto. The characteristic of the application program may include a name of the application program, and a version number of the application program, but is not limited thereto.

The searching unit may be used for a corresponding application program indicated by the characteristic of the application program to perform search according to the search characteristic.

The transmitting unit may be configured to transmit found data to the second electronic terminal.

In an example embodiment, the first electronic terminal may further include a determining unit and a login unit.

For example, when logging in to a message application program in the first electronic terminal with an account, usage situation of the account in the second electronic terminal may be determined by the determining unit. The determining unit may determine the usage situation, according to the user data which is acquired from the second electronic terminal and is associated with the application program.

The login unit may be configured to log in to the account in the first electronic terminal without performing additional authentication in the second electronic terminal, when it is determined that the usage situation meets a predetermined condition.

For example, when logging in to a message application program in the first electronic terminal with an account, usage situation of the account in the second electronic terminal may be determined by the determining unit. When the same message application program in the second electronic terminal is logged in with the account more than a certain number of times, the account may be used by the login unit to login to the message application program in the first electronic terminal without additional authentication in the second electronic terminal.

Figure 11:
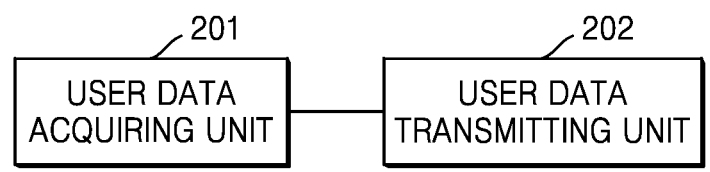
FIG. 11 illustrates a block diagram of a second electronic terminal for providing data, according to an example embodiment.

FIG. 11 illustrates a block diagram of a second electronic terminal for providing data according to an example embodiment.

Referring to FIG. 11, the second electronic terminal may include a user data acquiring unit 201 and a user data transmitting unit 202. In an example embodiment, the second electronic terminal may further include another component. For example, the second electronic terminal may further include a component as a mobile communication terminal, a panel computer, a game console, and a digital multi-media player, but is not limited thereto.

The user data acquiring unit 201 may be configured to acquire user data associated with an application program in the second electronic terminal. The user data may include personalized data generated by the application program. The personalized data may be generated by using the application program with an account of a user. The personalized data may be generated by a user directly using the application program.

For example, when a user uses an input method (for example, a certain Chinese Pinyin input method) in an electronic terminal, he may not be signed in with his account. Accordingly, user data associated with the input method may be generated according to the user's input to the electronic terminal, and a personalized lexicon may be generated by recording the user's input habit.

The personalized data may include at least one from among input history data, browsing history data, and operation step history data. The browsing history data may be generated based on the user's browsing through the application program. The operation step history data may be generated based on the user's operation steps performed in the application program. For example, when the user moves from a current page to a next page or a previous page in the application program, the operation step history data may be generated based on an operation step of moving from a current page to a next page or a previous page. The input history data may be generated based on the user's input to an input box of the application program. For example, the input history data may be generated based on characters input by the user, and selecting an option by the user.

The input history data may include search history data. The search history data may be generated based on the user's searches performed in the application program.

The user data acquiring unit 201 may acquire the user data associated with the application program according to the user's operation. The user data acquiring unit 201 may acquire the user data associated with the application program automatically.

For example, the user data acquiring unit 201 may actively request the user data associated with the application program. The user data associated with the application program may also be acquired according to a request of the first electronic terminal, but is not limited thereto.

In an example embodiment, the user data acquiring unit 201 may include a detecting unit and an acquiring unit. In an example embodiment, whether there is an update of the user data associated with the application program may be detected by the detecting unit. When there is the update of the user data, the acquiring unit may be configured to acquire the user data.

The user data associated with the application program may occur when executing the application program, thus, when executing the application program the detecting unit may detect whether there is the update of the user data associated with this application program. In an example embodiment, whether there is the update of the user data associated with the application program may be detected by the detecting unit when an establishment of the association channel is detected.

The user data transmitting unit 202 may be used for transmitting the user data to the first electronic terminal. In an example embodiment, the user data transmitting unit 202 may transmit the user data through an association channel or another communication channel. When the association channel is unable to be established, the user data may be transmitted to the first electronic terminal through the other communication channel by the user data transmitting unit 202.

In an example embodiment, the second electronic terminal may further include an association determining unit.

The association determining unit may determine the first electronic terminal associated with the second electronic terminal according to association information recorded in the second electronic terminal. The association determining unit may determine the first electronic terminal associated with the second electronic terminal through an account.

In an example embodiment, the second electronic terminal may further include a searching unit, a transmitting unit, and a receiving unit.

The searching unit may perform a search according to the search characteristic.

The receiving unit may receive from the first electronic terminal data found by the same application program in the first electronic terminal according to the search characteristic.

Figure 12:
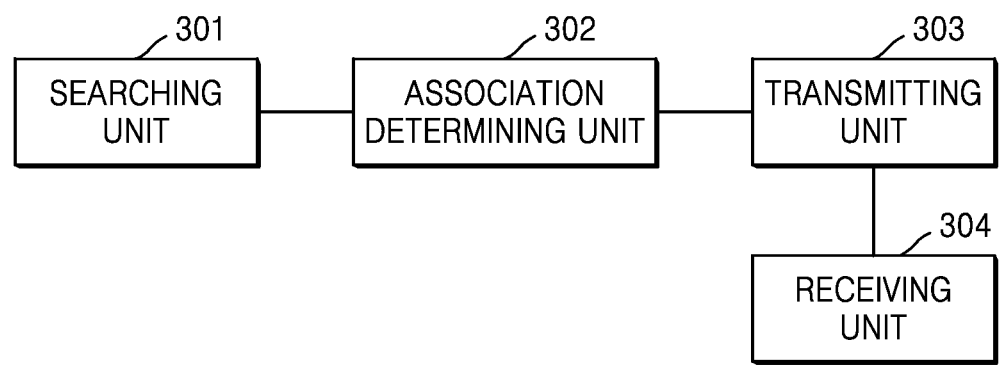
FIG. 12 illustrates a block diagram of a second electronic terminal for performing a search, according to an example embodiment.

FIG. 12 illustrates a block diagram of a second electronic terminal for performing a search according to an example embodiment.

The second electronic terminal may include a searching unit 301, an association determining unit 302, a transmitting unit 303, and a receiving unit 304. The second electronic terminal may further include another component. For example, the second electronic terminal may further include a component as a mobile communication terminal, a panel computer, a game console, and a digital multi-media player, but is not limited thereto.

The searching unit 301 may perform a search in an application program of the second electronic terminal according to a search characteristic. The search characteristic may include an input search keyword and a search parameter selected, but is not limited thereto.

The association determining unit 302 may be used for determining the first electronic terminal associated with the second electronic terminal. For example, the association determining unit may determine the first electronic terminal associated with the second electronic terminal according to association information recorded in the second electronic terminal. The association information recorded in an electronic terminal may indicate whether the electronic terminal is associated with another electronic terminal, or with which terminal the electronic terminal is associated with.

An electronic terminal may be associated with another electronic terminal based on a user's operation.

For example, the user may allow the other electronic terminal to be associated with the electronic terminal by a certain application, or by scanning an image such as 2D code.

The electronic terminal may be associated with the other electronic terminal automatically. For example, when the electronic terminal is a smartphone which is capable of pairing with a smart-watch such as Samsung Galaxy Gear, and the smartphone may be paired with the smart-watch according to the user's operation to perform an association of the smartphone and smart-watch.

The association determining unit 302 may determine the first electronic terminal associated with the second electronic terminal through an account. The first electronic terminal associated with the second electronic terminal may be determined based on an account. For example, when a user uses two electronic terminals with the same account, it may be determined by the association determining unit 302 that the two electronic terminals are associated with each other.

The transmitting unit 303 may be used to transmit the search characteristic and a characteristic of the application program to the first electronic terminal so that the first electronic terminal may perform a search in the same application program.

The characteristic of the application program may include a name of the application program, and a version number of the application program, but is not limited thereto.

In an example embodiment, when the search characteristic is for searching an image or a video, whether the first electronic terminal is provided with a camera may be determined.

The receiving unit 304 may receive from the first electronic terminal data found by the same application program in the first electronic terminal according to the search characteristic.

In an example embodiment, the transmitting unit 303 may transmit the search characteristic and the characteristic of the application program to the first electronic terminal through an association channel or another communication channel.

In an example embodiment, the search characteristic and the characteristic of the application program may be transmitted to the first electronic terminal through the other communication channel when the association channel is unable to be established. The receiving unit 304 may receive through the other communication channel from the first electronic terminal data found by the same application program in the first electronic terminal according to the search characteristic when the association channel is unable to be established.

In an example embodiment, the second electronic terminal may further include a display.

The display may be configured to display the data found by the application program in the second electronic terminal to be distinguished from data found by the first electronic terminal. For example, when displaying the search results in the second electronic terminal, data respectively found by the first electronic terminal and the second electronic terminal may be marked differently.

In an example embodiment, the second electronic terminal may further include a search history transmitting unit.

In an example embodiment, the search history transmitting unit may be used for transmitting a search history record to the first electronic terminal such that the first electronic terminal may set the transmitted search history record as its search history record in a corresponding application program.

Figure 13:
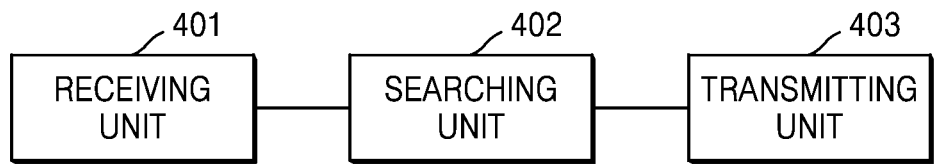
FIG. 13 illustrates a block diagram of a first electronic terminal for performing a search, according to an example embodiment.

FIG. 13 illustrates a block diagram of a first electronic terminal for performing a search according to an example embodiment.

Here, the first electronic terminal may be associated with the second electronic terminal, and perform a search in the first electronic terminal according to the search characteristic.

The first electronic terminal may include a receiving unit 401, a searching unit 402, and a transmitting unit 403. The first electronic terminal may further include another component. For example, the first electronic terminal may further include a component as a mobile communication terminal, a panel computer, a game console, and a digital multi-media player, but is not limited thereto.

The receiving unit 401 may be configured to receive a search characteristic and a characteristic of an application program from the second electronic terminal.

The search characteristic may include an input search keyword and a search parameter selected, but is not limited thereto. The characteristic of the application program may include a name of the application program, and a version number of the application program, but is not limited thereto.

The searching unit 402 may perform a search in an application program of the first electronic terminal according to a search characteristic.

In an example embodiment, the first electronic terminal may further include a determining unit.

In an example embodiment, when the search characteristic is for searching an image or a video, whether the first electronic terminal is provided with a camera may be determined by the determining unit. The searching unit 402 may perform a search according to the search characteristic in a corresponding application program indicated by the characteristic of the application program, in the first electronic terminal when it is determined by the determining unit that the first electronic terminal is provided with the camera. The searching unit 402 may not perform a search and notify the second electronic terminal, when it is determined by the determining unit that the first electronic terminal is not provided with the camera.

The transmitting unit 403 may be used for transmitting the found data to the second electronic terminal.

The receiving unit 401 may receive the search characteristic and the characteristic of the application program from the second electronic terminal through an association channel or another communication channel. The transmitting unit 403 may transmit the found data to the second electronic terminal through the other communication channel when the association channel is unable to be established. The receiving unit 401 may receive the search characteristic and the characteristic of the application program from the second electronic terminal through the other communication channel when the association channel is unable to be established.

In an example embodiment, the first electronic terminal may further include a storing unit.

The storing unit may be used for storing the search characteristic as a search history record of the application program.

In an example embodiment, the first electronic terminal may further include an association determining unit.

The association determining unit may determine the second electronic terminal associated with the first electronic terminal according to association information recorded in the first electronic terminal. The association information recorded in an electronic terminal may indicate whether the electronic terminal is associated with another electronic terminal, or with which terminal the electronic terminal is associated with.

The association determining unit may determine the second electronic terminal associated with the first electronic terminal through an account.

Figure 14A:
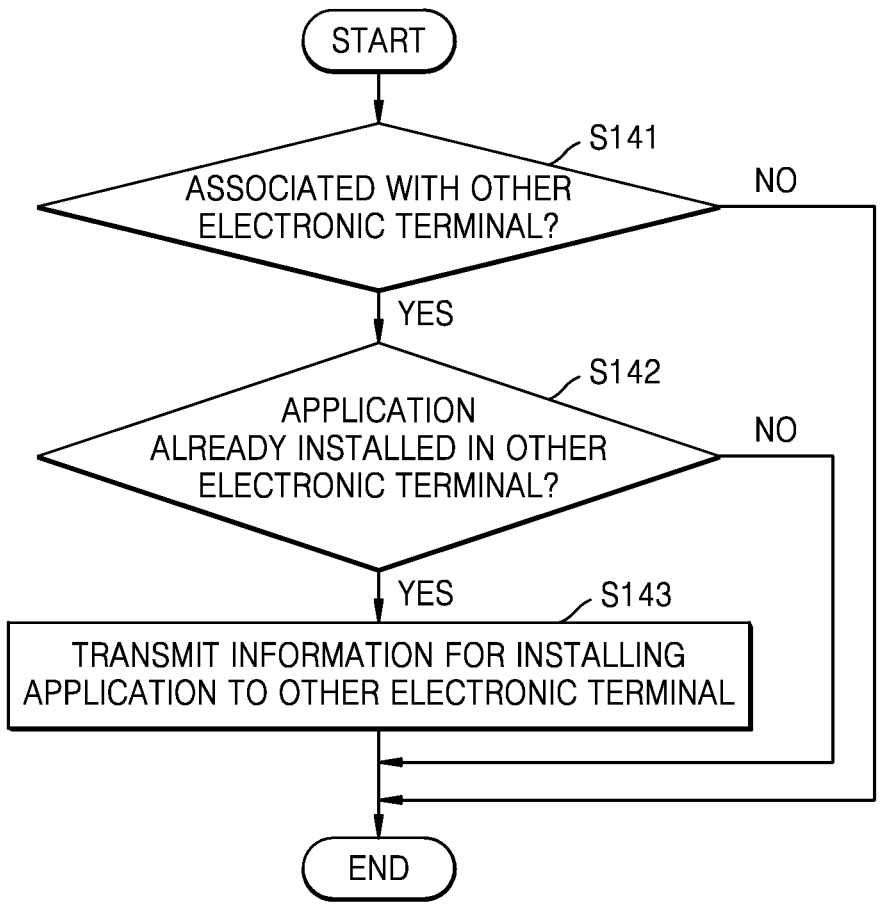
FIG. 14A illustrates a flowchart of a method of installing an application in an electronic terminal, according to an example embodiment.

FIG. 14A illustrates a flowchart of a method of installing an application in an electronic terminal, according to an example embodiment.

The method of installing application in an electronic terminal may be accomplished by the electronic terminal, or be implemented by a computer program. For example, the method may be performed by a function program in an operation system of the electronic terminal.

Referring to FIG. 14A, in operation S141, when installing an application in an electronic terminal, whether the electronic terminal is associated with another electronic terminal may be determined by the electronic terminal.

An association of two electronic terminals may be established such that one electronic terminal may have a permission of executing and controlling a certain functions of the other one. For example, when a smartphone and smart-watch are associated with each other, the smart-watch may receive and respond to a phone call made to the smartphone, and receive and respond to an email and message to the smartphone, but is not limited thereto. For example, the smartphone may push a message to the smart-watch, and forward a call to the smart-watch, but is not limited thereto.

Whether the electronic terminal is associated with another electronic terminal may be determined according to association information recorded in the electronic terminal. The association information recorded in an electronic terminal may indicate whether the electronic terminal is associated with another electronic terminal, or with which terminal the electronic terminal is associated with. An electronic terminal may be associated with another electronic terminal based on a user's operation. For example, the user may allow the other electronic terminal to be associated with the electronic terminal by a certain application, or by scanning an image such as 2D code. The electronic terminal may be associated with the other electronic terminal automatically. For example, when the electronic terminal is a smartphone which is capable of pairing with a smart-watch (for example, a Samsung Galaxy Gear), the smartphone may be paired with the smart watch according to the user's operation, so as to establish an association of the smartphone and the smart-watch.

Whether the electronic terminal is associated with the other electronic terminal may be determined through an account. For example, when a user uses a single account to manage two electronic terminals, it may be determined that the two electronic terminals are associated with each other through the account. For example, when the same application program is used in the two electronic terminals logged in with the same account for more than a predetermined time, it may be determined that the two electronic terminals are associated with each other. A method of determining whether the electronic terminal is associated with another electronic terminal is not limit thereto.

An association channel may be a short range communication channel such as a channel of Wi-Fi, ZigBee, NFC, and Bluetooth. When the first and second electronic terminals are associated with each other, the first and second electronic terminals may communicate with each other through the association channel when the first and second electronic terminals are in a communication range of the association channel.

When the association channel is unable to be established, for example, the first and second electronic terminals are out of a communication range of the association channel, the first and second electronic terminals may communicate with each other through other communication channel such as a mobile communication channel and a wired communication channel.

The association channel is not limited to the short range communication channel, and may further include a long range communication channel. The first and second electronic terminals may communicate with each other via the short range communication channel when they are in a communication range of the short range communication channel, and via the long range communication channel when they are out of the communication range of the short range communication channel. For example, the short range communication channel such as Wi-Fi, ZigBee, NFC, and Bluetooth. and the long range communication channel may be the mobile communication channel and the wired communication channel, but are not limited thereto.

When establishing an association between an electronic terminal and another electronic terminal, the electronic terminal may receive identification information of the other electronic terminal Identification information of the other electronic terminal may include information regarding a model name, specification, operating system, operating system version, and identifier of the other electronic terminal, but is not limited thereto. For example, the identification information may further include information regarding subscriber identity module (SIM) card number, universal subscriber identity module (USIM) card number, ID number, and a phone number of the other electronic terminal.

A pairing requesting message or pairing allowing message may be received from the other electronic terminal with its identification information.

The electronic terminal may refer to the identification information in order to transmit information for installing application in the other electronic terminal in operation S143.

When it is determined in operation S141 that the electronic terminal is associated with the other electronic terminal, operation S142 may be performed. In operation S142, it may be determined whether to install the application in the other electronic terminal.

In an example embodiment, when the user's operation indicating an installation of the application in the other electronic terminal is detected, it may be determined to install the application in the other electronic terminal.

Here, the user's operation indicating the installation of the application in the other electronic terminal may be input by a screen touch operation, a physical key press operation, a sound control operation, and etc.

In an example embodiment, when it is determined in operation S141 that the electronic terminal is associated with the other electronic terminal, the electronic terminal may prompt that the application is available for the other electronic terminal, and then it may be determined to install the application in the other electronic terminal when the user's operation indicating the installation of the application in the other electronic terminal is detected. For example, an interface for prompting that the application is available for the associated electronic terminal may be displayed on a screen of the electronic terminal, and it may be prompted through a voice that the application is available for the associated electronic terminal.

In an example embodiment, whether to install the application in the other electronic terminal may be determined according to a preset application association installation setting. Here, the application association installation setting may indicate an installation of the application in the associated electronic terminal. For example, when the application association installation setting in the electronic terminal is set as an 'ON', then it may be determined to always install the application in the other electronic terminal. When the application association installation setting in the electronic terminal is set as an "OFF", then it may be determined not to install the application in the other electronic terminal.

In an example embodiment, it may be determined whether to install the application in the other electronic terminal when the application is not installed in the other electronic terminal.

In an example embodiment, it may be determined to whether install the application in the other electronic terminal when a version of the application installed in the other electronic terminal is older than a version of the application installed in the electronic terminal. In other word, when it is detected that the version of the application installed in the other electronic terminal is not the latest version, it may be determined to install the latest version of the application in the other electronic terminal, such that an update of the version of the application is applied to the associated electronic terminal.

When it is determined to install the application in the other electronic terminal in operation S142, operation S143 may be performed. In step S143, information for installing the application may be transmitted to the other electronic terminal to install the application in the other electronic terminal. Here, the information for installing the application may include an installation file of the application, an address for downloading the installation file of the application, and identification information of the application, but is not limited thereto. The identification information of the application may include at least one from among a name information of the application, version information of the application, and developer information of the application. The version information of the application may include information regarding a version number of the application.

The information for installing the application may be transmitted to the other electronic terminal through an association channel or another communication channel. The information for installing the application may be transmitted to the other electronic terminal through the other communication channel when the association channel is unable to be established.

In an example embodiment, a version of the application adaptive to the other electronic terminal may be determined. The electronic terminal may refer to the identification information of the other electronic terminal to determine a version of the application adaptive to the other electronic terminal. Information for installing the version of the application adaptive to the other electronic terminal may be transmitted to the other electronic terminal upon determining the version of the application. For example, when the electronic terminal and the other electronic terminal are operated by different operation systems (for example, one is operated by an android system of Google Inc., and the other one is operated by an iOS system of Apple Inc.), then the version of the application adaptive to the electronic terminal and that adaptive to the other electronic terminal are different from each other. When the electronic terminal is a smartphone, and the other electronic terminal is a smartwatch, the versions of the applications adaptive to the electronic terminal and the other electronic terminal may be different from each other, so the information for installing the version of the application adaptive to the other electronic terminal may be transmitted to the other electronic terminal to facilitate an installation of the adaptive version of the application by the other electronic terminal.

When a version of the application adaptive to the electronic terminal is the same as the version of the application adaptive to the other electronic terminal, the information for installing the version of the application adaptive to the other electronic terminal includes at least one from among an installation file of the version of the application adaptive to the electronic terminal, an address for downloading the installation file of the version of the application adaptive to the electronic terminal, and identification information of the application. The identification information of the application may include at least one from among a name information of the application, version information of the application, and developer information of the application. Here, the version information of the application is information of the version of the application adaptive to the electronic terminal.

When a version of the application adaptive to the electronic terminal is different from the version of the application adaptive to the other electronic terminal, the information for installing the version of the application adaptive to the other electronic terminal includes at least one from among an installation file of the version of the application adaptive to the other electronic terminal, an address for downloading the installation file of the version of the application adaptive to the other electronic terminal, and identification information of the application. The identification information of the application may include at least one from among a name information of the application, version information of the application, and developer information of the application. Here, the version information of the application may include information of the version of the application adaptive to the electronic terminal. Further, the version information of the application may include information of the version of the application adaptive to the other electronic terminal, for example, a version number of the version of the application adaptive to the other electronic terminal.

When information for installing the application is received at the other electronic terminal, the other electronic terminal may install the same application based on the received information automatically or in response to the user's operation.

Figure 14B:
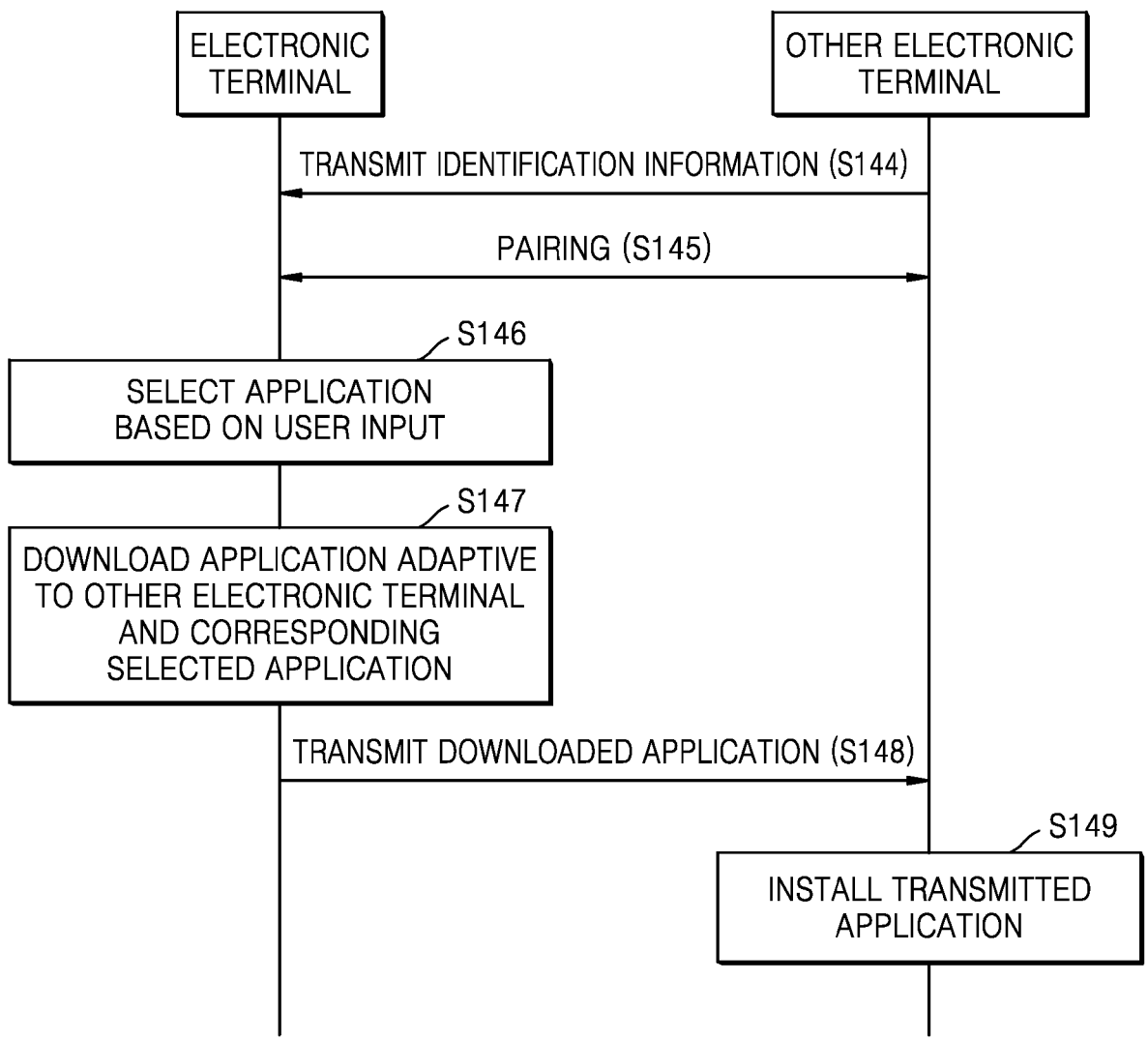
FIG. 14B illustrates a flowchart of a method of installing an application in an electronic terminal, according to an example embodiment.

FIG. 14B illustrates a flowchart of a method of installing an application in an electronic terminal, according to an example embodiment.

In operation S144, an electronic terminal may receive identification information of another electronic terminal from the other electronic terminal.

Identification information of the other electronic terminal may include information regarding a model name, specification, operating system, operating system version, and identifier of the other electronic terminal, but is not limited thereto. A pairing requesting message or pairing allowing message may be received from the other electronic terminal with its identification information.

In operation S145, the electronic terminal may pair with the other electronic terminal based on the identification information of the other electronic terminal.

Here, pairing between the electronic terminal and the other electronic terminal may be performed via a short range communication. The short range communication may be Wi-Fi, ZigBee, NFC, and Bluetooth, but is not limited thereto.

In operation S146, the electronic terminal may select an application based on a user input.

In an example embodiment, when a new application is installed in the electronic terminal, the new application may be selected. In an example embodiment, when an application is updated in the electronic terminal, the application updated may be selected. In an example embodiment, when a user selects in the electronic terminal an option of installing an application in other electronic terminal, the application may be selected.

In operation S147, the electronic terminal may download an application corresponding to the selected application and adaptive to the other electronic terminal.

The application corresponding to the selected application may be the same as or compatible with the selected application.

The application adaptive to the other electronic terminal may be an application that is capable of being installed in the other electronic terminal.

The electronic terminal may refer to the identification information received in operation S144 in order to download the application adaptive to the other electronic terminal.

Identification information of the other electronic terminal may include information regarding a model name, specification, operating system, operating system version, and identifier of the other electronic terminal, but is not limited thereto.

The electronic terminal may refer to information regarding an operating system of the other electronic terminal in order to download the application adaptive to the other electronic terminal.

The electronic terminal may download an application adaptive to the operating system of the other electronic terminal based on the information regarding the operating system and corresponding to the selected application.

In operation S148, the electronic terminal may transmit the downloaded application to the other electronic terminal.

In operation S149, the other electronic terminal may install the transmitted application therein.

Figure 15:
FIG. 15 illustrates an example electronic terminal according to an example embodiment.

FIG. 15 illustrates an example electronic terminal according to an example embodiment.

An electronic terminal may be a smartphone, a smartwatch, a personal computer, a panel computer, a game console, a digital media player, or any type of electronic device in which an application is installed.

Referring to FIG. 15, the electronic terminal may include an association determination unit 151, an installation determination unit 152, and an information transmission unit 153. A unit included in the first electronic terminal and the second electronic terminal may be implemented by a dedicated device, but is not limited thereto. For example, the unit may be implemented by a universal hardware processor, such as a digital signal processor, and a field programmable gate array, but is not limited thereto.

The unit may be implemented by a dedicated hardware processor such as a dedicated chip, and may be implemented by a computer program. For example, the unit may be implemented as a module in an application program installed in the electronic terminal, or may be implemented as a function program of an operation system of the electronic terminal.

The electronic terminal may further include another component. For example, the electronic terminal may further include a component as a mobile communication terminal, a panel computer, a game console, and a digital multi-media player, but is not limited thereto.

The association determination unit 151 may be used for, when installing the application in the electronic terminal, determining whether the electronic terminal is associated with another electronic terminal.

The association determination unit 151 may be configured to determine the other electronic terminal associated with the electronic terminal according to association information recorded in the electronic terminal. The association information recorded in an electronic terminal may indicate whether the electronic terminal is associated with another electronic terminal, or with which terminal the electronic terminal is associated with. An electronic terminal may be associated with another electronic terminal based on a user's operation. For example, the user may allow the other electronic terminal to be associated with the electronic terminal by a certain application, or by scanning an image such as 2D code. The electronic terminal may be associated with the other electronic terminal automatically. For example, when the electronic terminal is a smartphone which is capable of pairing with a smart-watch (for example, a Samsung Galaxy Gear), the smartphone may be paired with the smart watch according to the user's operation, so as to establish an association of the smartphone and the smart-watch.

Whether the electronic terminal is associated with the other electronic terminal may be determined through an account by the association determining unit 151. For example, when a user uses a single account to manage two electronic terminals, it may be determined by the association determining unit 151 that the two electronic terminals are associated with each other through the account. For example, when the same application program is used in the two electronic terminals logged in with the same account for more than a predetermined time, it may be determined by the association determining unit 151 that the two electronic terminals are associated with each other. A method of determining whether the electronic terminal is associated with another electronic terminal is not limit thereto.

An association channel may be a short range communication channel such as Wi-Fi, ZigBee, NFC, and Bluetooth. When the first and second electronic terminals are associated with each other, the first and second electronic terminals may communicate with each other through the association channel when the first and second electronic terminals are in a communication range of the association channel.

When the association channel is unable to be established, for example, the first and second electronic terminals are out of a communication range of the association channel, the first and second electronic terminals may communicate with each other through other communication channel such as a mobile communication channel and a wired communication channel. The association channel is not limited to the short range communication channel, and may further include a long range communication channel. The first and second electronic terminals may communicate with each other via the short range communication channel when they are in a communication range of the short range communication channel, and via the long range communication channel when they are out of the communication range of the short range communication channel. For example, the short range communication channel such as Wi-Fi, ZigBee, NFC, and Bluetooth. and the long range communication channel may be the mobile communication channel and the wired communication channel, but are not limited thereto.

The installation determination unit 152 may be used for determining whether to install the application in the other electronic terminal when the electronic terminal is associated with the other electronic terminal.

In an example embodiment, when the user's operation indicating an installation of the application in the other electronic terminal is detected, it may be determined to install the application in the other electronic terminal.

Here, the user's operation indicating the installation of the application in the other electronic terminal may be input by a screen touch operation, a physical key press operation, a sound control operation, and etc.

In an example embodiment, when it is determined that the electronic terminal is associated with the other electronic terminal, the installation determination unit 152 may prompt that the application is available for the other electronic terminal, and then it may be determined to install the application in the other electronic terminal when the user's operation indicating the installation of the application in the other electronic terminal is detected. For example, an interface for prompting that the application is available for the associated electronic terminal may be displayed by the installation determination unit 152 on a screen of the electronic terminal, and it may be prompted through a voice that the application is available for the associated electronic terminal.

In an example embodiment, whether to install the application in the other electronic terminal may be determined by the installation determination unit 152 according to a preset application association installation setting. Here, the application association installation setting may indicate an installation of the application in the associated electronic terminal. For example, when the application association installation setting in the electronic terminal is set as an 'ON', then it may be determined by the installation determination unit 152 to always install the application in the other electronic terminal. When the application association installation setting in the electronic terminal is set as an "OFF", then it may be determined by the installation determination unit 152 not to install the application in the other electronic terminal.

In an example embodiment, the installation determination unit 152 may include a detection unit and a determination unit.

The detection unit may be used for detecting whether the application is installed in the other electronic terminal. The determination unit may be used for determining to install the application in the other electronic terminal when the application is not installed in the other electronic terminal.

In an example embodiment, the detection unit may detect whether a version of the application installed in the other electronic terminal is older than a version of the application installed in the electronic terminal. In an example embodiment, it may be determined by the determination unit to whether install the application in the other electronic terminal when a version of the application installed in the other electronic terminal is older than a version of the application installed in the electronic terminal. In other word, when it is detected that the version of the application installed in the other electronic terminal is not the latest version, it may be determined to install the latest version of the application in the other electronic terminal, such that an update of the version of the application is applied to the associated electronic terminal.

The information transmission unit 153 may be used for transmitting information for installing the application to the other electronic terminal when it is determined to install the application in the other electronic terminal. Here, the information for installing the application may include an installation file of the application, an address for downloading the installation file of the application, and identification information of the application, but is not limited thereto. The identification information of the application may include at least one from among a name information of the application, version information of the application, and developer information of the application. The version information of the application may include information regarding a version number of the application.

The information for installing the application may be transmitted by the information transmission unit 153 to the other electronic terminal through an association channel or another communication channel. The information for installing the application may be transmitted by the information transmission unit 153 to the other electronic terminal through the other communication channel when the association channel is unable to be established.

In an example embodiment, the information transmission unit 153 may include a version determination unit and a transmission unit.

The version determination unit may be used for determining a version of the application adaptive to the other electronic terminal.

The transmission unit may be used for transmitting information for installing the version of the application adaptive to the other electronic terminal to the other electronic terminal. For example, when the electronic terminal and the other electronic terminal are operated by different operation systems (for example, one is operated by an android system of Google Inc., and the other one is operated by an iOS system of Apple Inc.), then the version of the application adaptive to the electronic terminal and that adaptive to the other electronic terminal are different from each other. When the electronic terminal is a smartphone, and the other electronic terminal is a smart-watch, the versions of the applications adaptive to the electronic terminal and the other electronic terminal may be different from each other, so the information for installing the version of the application adaptive to the other electronic terminal may be transmitted to the other electronic terminal to facilitate an installation of the adaptive version of the application by the other electronic terminal.

When a version of the application adaptive to the electronic terminal is the same as the version of the application adaptive to the other electronic terminal, the information for installing the version of the application adaptive to the other electronic terminal includes at least one from among an installation file of the version of the application adaptive to the electronic terminal, an address for downloading the installation file of the version of the application adaptive to the electronic terminal, and identification information of the application. The identification information of the application may include at least one from among a name information of the application, version information of the application, and developer information of the application. Here, the version information of the application is information of the version of the application adaptive to the electronic terminal.

When a version of the application adaptive to the electronic terminal is different from the version of the application adaptive to the other electronic terminal, the information for installing the version of the application adaptive to the other electronic terminal includes at least one from among an installation file of the version of the application adaptive to the other electronic terminal, an address for downloading the installation file of the version of the application adaptive to the other electronic terminal, and identification information of the application. The identification information of the application may include at least one from among a name information of the application, version information of the application, and developer information of the application. Here, the version information of the application may include information of the version of the application adaptive to the electronic terminal. Further, the version information of the application may include information of the version of the application adaptive to the other electronic terminal, for example, a version number of the version of the application adaptive to the other electronic terminal.

Units described may be implemented as units included in any device for installing the application.

According to example embodiments, when installing an application in an electronic terminal, information for installing the application in another electronic terminal may be transmitted to the other electronic terminal without a user's manual operation.

Disclosed embodiments may have different forms and should not be construed as being limited to the descriptions set forth herein. Rather, these embodiments are provided so that this disclosure will be thorough and complete and will fully convey the concept of the embodiments to one of ordinary skill in the art.

Figure 16:
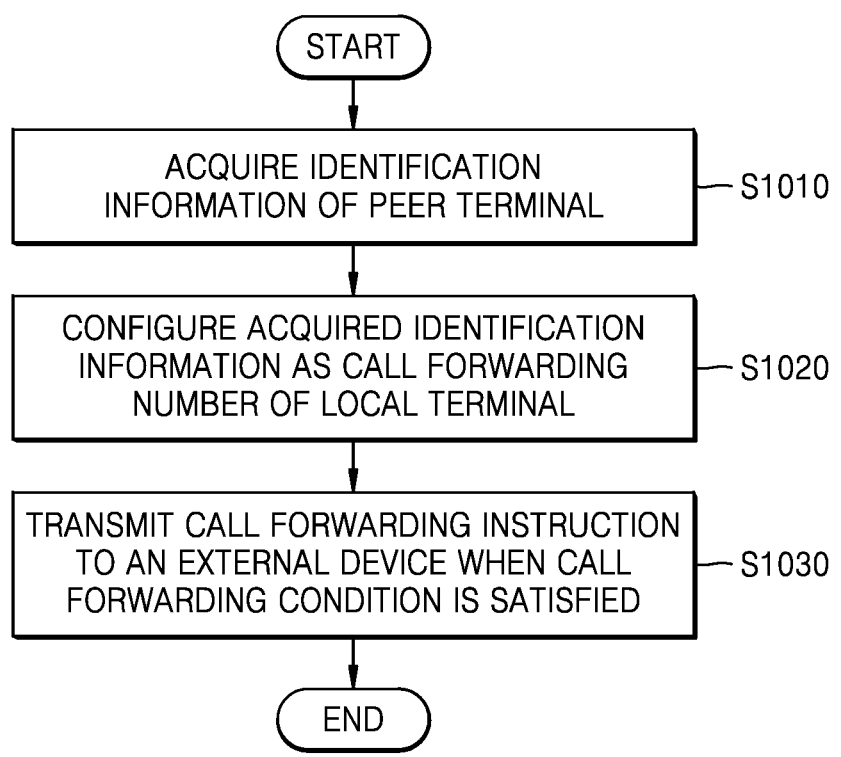
FIG. 16 illustrates a flowchart of a call forwarding method according to an example embodiment.

FIG. 16 illustrates a flowchart of a call forwarding method according to an example embodiment.

A call forwarding method according to an example embodiment may be performed in a local terminal. In the present disclosure, the local terminal may be a smartphone, but is not limited thereto.

In operation S1010, the local terminal may obtain identification information of a peer terminal.

Here, there may be one or more peer terminals. In the present embodiment, the peer terminal may be a card-size phone, but is not limited thereto. For example, the peer terminal may be a wearable device such as a smart-watch, a smart-glass, a smart-band.

The identification information may further include information regarding subscriber identity module (SIM) card number, universal subscriber identity module (USIM) card number, ID number, and a phone number of the other electronic terminal, but is not limited thereto.

In operation S1020, the local terminal may configure the identification information as call forwarding number of the local terminal.

Here, when the call forwarding number is already set in the local terminal, the call forwarding number is updated with the identification information.

In operation S1030, the local terminal may transmit a call forwarding instruction to an external apparatus when a call forwarding condition is satisfied. Here, the call forwarding instruction may include the identification information of the peer terminal. The call forwarding instruction may be a receiver change request.

In operation S1030, based on whether the call forwarding condition is satisfied, a subject which receives a call may be determined.

The external apparatus may be a network-side server providing service for the local terminal and the peer terminal, but is not limited thereto.

The call forwarding condition may include whether a network connection between the terminals are stable, a signal strength from the local or peer terminal is greater than a threshold value, a remaining battery of the local terminal is greater than a threshold value, but is not limited thereto.

Users carrying a smartphone may often carry another phone such as a card-size phone. Here, two phones may obtain their telephone numbers from card modules such as SIM card or USIM card, then establish a connection between them to transmit their telephone number to each other. When the call forwarding is satisfied, the card-size phone may receive a call made to the smartphone, and vice versa. Therefore, a user may always respond to a call made to any phone.

In an example embodiment, the identification information of the peer terminal may be pre-obtained, and then configured as a call forwarding number of the local terminal. The local terminal may transmit a call forwarding instruction to an external apparatus when a call forwarding condition is satisfied. Here, the call forwarding instruction may include the identification information of the peer terminal.

Therefore, automatic call forwarding between a plurality of terminals may be achieved according to an example embodiment. Accordingly, complexity of setting the call forwarding may be reduced.

Figure 17:
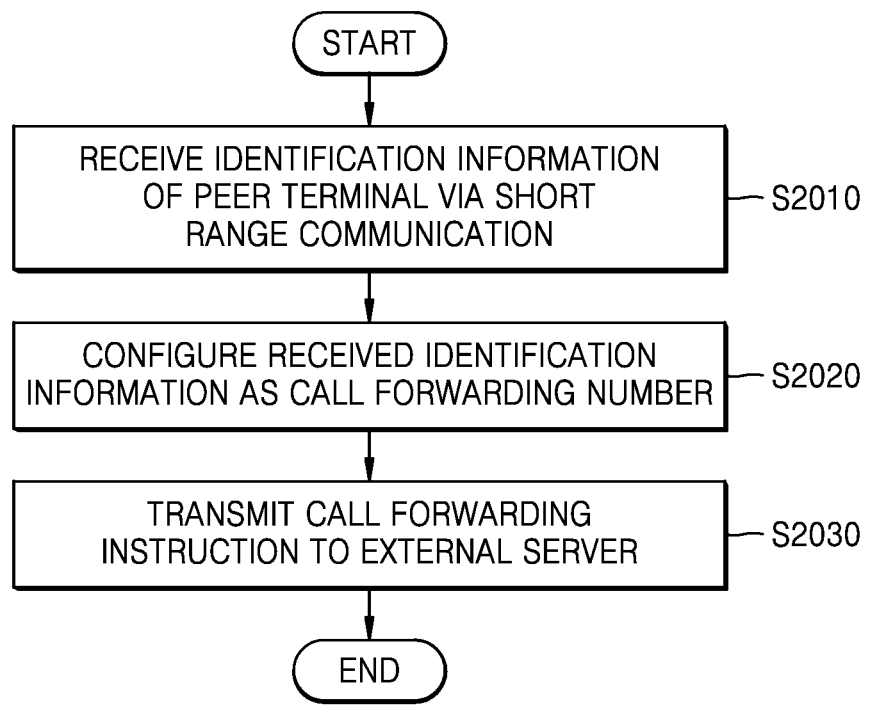
FIG. 17 illustrates a flowchart of a call forwarding method according to an example embodiment.

FIG. 17 illustrates a flowchart of a call forwarding method according to an example embodiment.

In operation S2010, the local terminal may receive the identification information of the peer terminal from the peer terminal through the short range communication.

Here, the short range communication may be Wi-Fi, ZigBee, NFC, and Bluetooth, but are not limited thereto.

Automatic call forwarding between a plurality of terminals may be achieved by the short range communication according to an example embodiment.

The local terminal and the peer terminal may control or perform a function of the other one. A corresponding operation is performed in the local terminal or the peer terminal by controlling or performing a function thereof. The function may include a function of calling, responding to a call, playing music, message notification, synchronization of contacts, but is not limited thereto. When the local terminal and the peer terminal are connected to each other by the short range communication, the local terminal and the peer terminal may process by the short range communication a call made to the other one.

In operation S2020, the local terminal may configure the identification information as call forwarding number of the local terminal.

Here, when the call forwarding number is already set in the local terminal, the call forwarding number is updated with the identification information.

In operation S2030, the local terminal may transmit a call forwarding instruction to an external apparatus when a call forwarding condition is satisfied. Here, the call forwarding instruction may include the identification information of the peer terminal.

When the short range communication connection with the peer terminal is disconnected, the call forwarding condition may be determined to be satisfied. The short range communication connection with the peer terminal is disconnected when the local terminal and the peer terminal are distanced to a certain extent, for example, when a user only carries the peer terminal, the user still may respond by the peer terminal to a call made to the local terminal according to an example embodiment.

When a user carry a card-size phone and a smartphone together, the two phones may be connected with each other by the short range communication connection, and a call forwarding number for each phone may be set as an opponent's phone number. When the user only carry one of the two phones, the connection between the two phone may be disconnected. When a call is made to the smartphone that is not carried by the user, a call forwarding condition of the smartphone may be determined to be satisfied. The smartphone may transmit a telephone number of the card-size phone to a server, and the server may transmit to the card-size phone the call made to the smartphone. Therefore, automatic call forwarding between the terminals may be achieved according to an example embodiment.

The number of the local terminal and peer terminal is not limited to two, and the local terminal and peer terminal are not limited to a smartphone and a card-size phone. The terminal may be any type of a phone and any type of a wearable device, but is not limited thereto.

In an example embodiment, when it is detected that a connection between the local terminal and the peer terminal is disconnected, whether status of the local terminal meets with a certain standard may be determined. When the status of the local terminal does not meet with the certain standard, the call forwarding condition of the local terminal may be determined to be satisfied.

The local terminal and the peer terminal may be connected to each other by Bluetooth which is often disconnected when the terminals are close enough. When status of a terminal is normal, the terminal may be used to respond to a call. In an example embodiment, it may be further determined whether status of the local terminal meets with a certain standard to determine whether to forward a call.

In an example embodiment, when the short range communication connection with the peer terminal is disconnected, whether the local terminal is in a stationary state may be determined.

That is, when the local terminal is in the stationary state, the call forwarding condition may be determined to be satisfied.

In an example embodiment, when the local terminal is in a non-stationary state, call forwarding instruction may be transmitted to the peer terminal to indicate that the local terminal may be used to respond to a call or to instruct the peer terminal to forward a call to the local terminal.

Whether the local terminal is in the stationary state or in the non-stationary state may be determined by an internal sensor of the local terminal. The local terminal may be determined as being in the stationary state, when it is not carried by the user. The local terminal may be determined as being in the non-stationary state, when it is carried by the user.

According to an example embodiment, the accuracy of the automatic call forwarding may improve by determining whether the local terminal is in the stationary state or in the non-stationary state.

In an example embodiment, the call forwarding condition of the local terminal may be satisfied when the local terminal is in the stationary state and status of the peer terminal meets with a certain standard.

When the local terminal is in the stationary state, it may be further determined whether the status of the peer terminal meets with a certain standard to determine whether the call forwarding condition of the local terminal is satisfied. For example, a remaining battery and signal strength of the peer terminal may be compared to threshold values.

The status of the peer terminal may be monitored by the local terminal, or may be acquired from feedback of the peer terminal. An operation of acquiring feedback of the peer terminal may include operations of transmitting a status determining request to the peer terminal, receiving a feedback to the status determining request from the peer terminal, and determining the status of the peer terminal based on the feedback from the peer terminal.

In an example embodiment, the call forwarding instruction may be transmitted to the peer terminal when the local terminal is in the non-stationary state and status of the local terminal meets with a certain standard.

The local terminal may be determined as being in the non-stationary state, when it is carried by the user. Therefore, the local terminal may be used to respond to every call. When the local terminal is in the non-stationary state, it may be further determined whether the status of the local terminal meets with a certain standard to determine whether to transmit the call forwarding instruction to the peer terminal. For example, a remaining battery and signal strength of the local terminal may be compared to threshold values.

In an example embodiment, when the local terminal and the peer terminal are connected with each other by the short range communication, whether the call forwarding condition is satisfied may be determined based on the status of the local terminal. The call forwarding condition may be determined to be satisfied when the status of the local terminal does not meet with the certain standard.

In an example embodiment, the call forwarding condition of the local terminal may be satisfied when the status of the local terminal does not meet with a certain standard and the status of the peer terminal meets with a certain standard.

When the status of the local terminal does not meet with the certain standard, the local terminal may not be capable of performing functions as required, so the peer terminal may be used to respond to a call when the status of the peer terminal meets with the certain standard.

In an example embodiment, the certain standard may include a certain value of a signal strength and a remaining battery, but is not limited thereto. For example, a threshold value of the remaining battery may be configured as 5%, 10% and so on.

In an example embodiment, when the call forwarding condition is not satisfied, the call forwarding configuration may be released.

For example, when the certain standard is 5% of a remaining battery, and a remaining battery of the local terminal is recovered from 3% to 5%, the call forwarding configuration may be released.

In an example embodiment, when short range communication connection between the local terminal and the peer terminal is re-connected from disconnection, the call forwarding configuration may be released. When the call forwarding configuration is released, the local terminal or the peer terminal may display a notification through a ring tone, vibration, or text information, but is not limited thereto.

In an example embodiment, the identification information of the peer terminal may be pre-obtained, and then configured as a call forwarding number of the local terminal A call forwarding instruction including the identification information may be transmitted to an external apparatus when the call forwarding condition is satisfied. According to example embodiments, a call may be forwarded between devices based on status of the devices.

Figure 18:
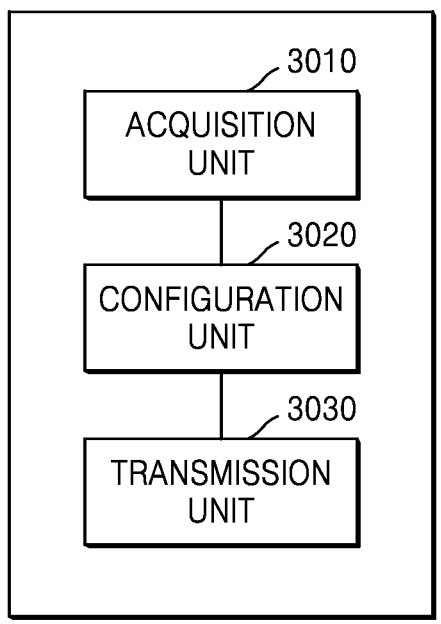
FIG. 18 illustrates an example local terminal according to an example embodiment.

FIG. 18 illustrates an example local terminal according to an example embodiment.

The local terminal may include an acquisition unit 3010, a configuration unit 3020, and a transmission unit 3030.

The acquisition unit 3010 may be configured to acquire identification information of a peer terminal. The acquisition unit 3010 may be implemented by a communication interface 1300 of the electronic device 1000 illustrated in FIGS. 20 and 23.

The configuration unit 3020 may be used for configuring the identification information acquired by the acquiring unit 301 as a call forwarding number of the local terminal. The configuration unit 3020 may be implemented by a controller 1100 of the electronic device 1000 illustrated in FIGS. 20 and 23.

A call forwarding instruction including the identification information may be transmitted by the transmission unit 3030 to an external apparatus when the call forwarding condition is satisfied. The transmission unit 3030 may be implemented by a communication interface 1300 of the electronic device 1000 illustrated in FIGS. 20 and 23.

A function of each unit of the local terminal may correspond to each operation described by referring to FIG. 16.

According to example embodiments, the local terminal may pre-acquire identification information of a peer terminal and the identification information is configured as a call forwarding number of the local terminal, and then a call forwarding instruction including the identification information may be transmitted to an external device.

According to example embodiments, a call may be forwarded between devices based on status of the devices.

Figure 19:
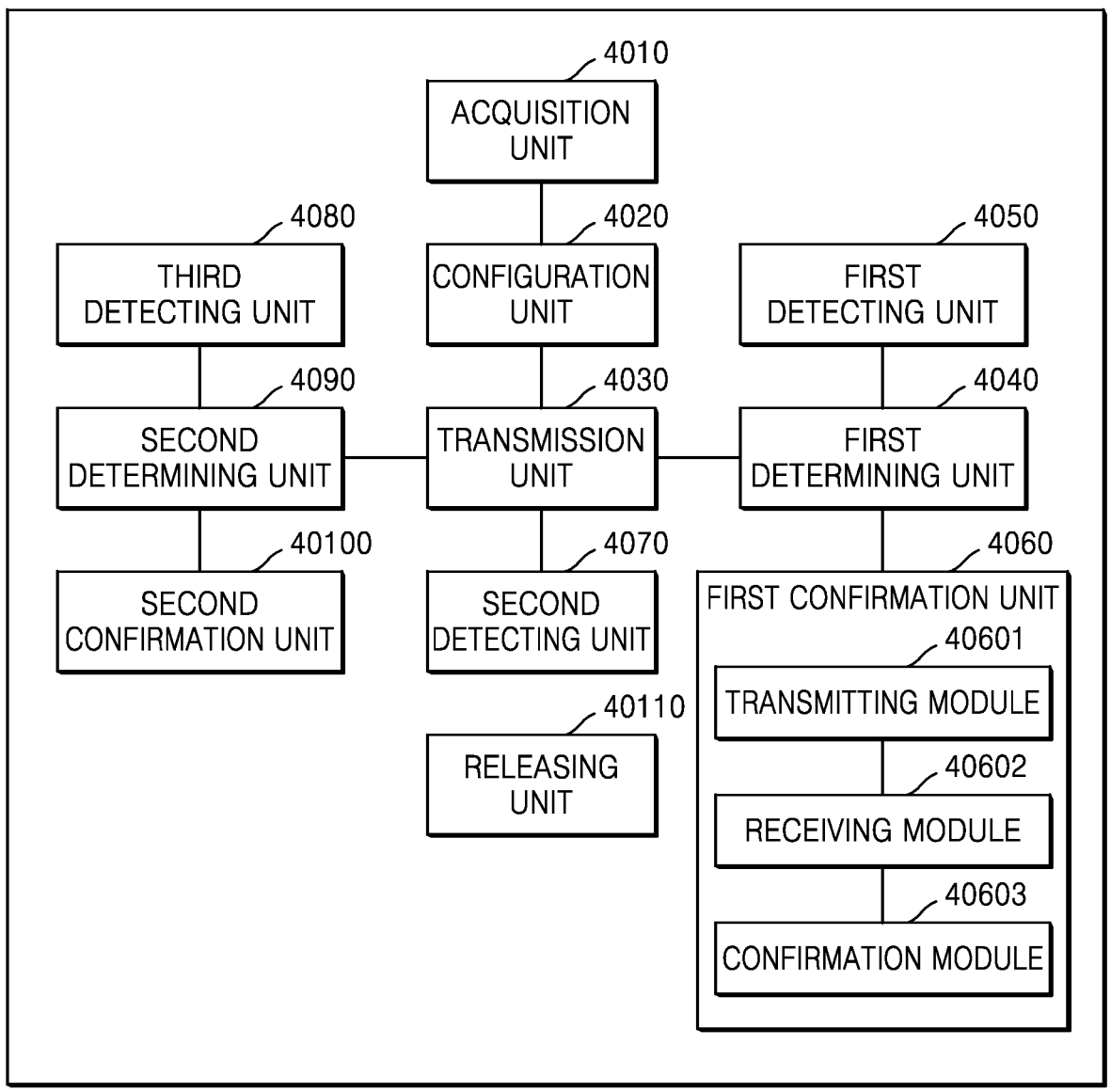
FIG. 19 illustrates an example local terminal according to an example embodiment.

FIG. 19 illustrates an example local terminal according to an example embodiment.

The local terminal may include an acquisition unit 4010, a configuration unit 4020, and a transmission unit 4030.

The acquisition unit 4010 may be configured to acquire identification information of a peer terminal. The acquisition unit 4010 may be implemented by a communication interface 1300 of the electronic device 1000 illustrated in FIGS. 20 and 23.

The configuration unit 4020 may be used for configuring the identification information acquired by the acquiring unit 4010 as a call forwarding number of the local terminal. The configuration unit 4020 may be implemented by a controller 1100 of the electronic device 1000 illustrated in FIGS. 20 and 23.

A call forwarding instruction including the identification information may be transmitted by the transmission unit 4030 to an external apparatus when the call forwarding condition is satisfied. The transmission unit 4030 may be implemented by a communication interface 1300 of the electronic device 1000 illustrated in FIGS. 20 and 23.

The acquisition unit 4010 may be configured to receive the identification information from the peer terminal via the short range communication.

A function of either of the local terminal and the peer terminal may be controlled through the short range communication by at least one of the local terminal and the peer terminal. When the local terminal and the peer terminal are connected to each other by the short range communication, the local terminal and the peer terminal may process by the short range communication a call made to the other one.

In an example embodiment, the local terminal may further include a first determining unit 4040.

When the short range communication connection with the peer terminal is disconnected, the call forwarding condition is determined by the first determining unit 4040 to be satisfied.

In an example embodiment, the local terminal may further include a first detecting unit 4050.

In an example embodiment, when it is detected that a connection between the local terminal and the peer terminal is disconnected, whether status of the local terminal meets with a certain standard may be determined by the first detecting unit 4050.

When the status of the local terminal does not meet with the certain standard, the call forwarding condition of the local terminal may be determined by the first determining unit 4040 to be satisfied.

The first determining unit 4040 may determine whether the local terminal is in a stationary state when the short range communication connection with the peer terminal is disconnected, and determine that the call forwarding condition is satisfied if the local terminal is in the stationary state.

In an example embodiment, the local terminal may further include a first confirmation unit 4060.

The first confirmation unit may be configured to determine whether status of the peer terminal meets with a certain standard when the local terminal is in the stationary state.

When the status of the peer terminal meets with the certain standard, the call forwarding condition of the local terminal may be determined by the first determining unit 4040 to be satisfied.

The first confirmation unit 4060 may include a transmitting module 40601, a receiving module 40602, and a confirmation unit 40603.

A status determining request may be transmitted to the peer terminal by the transmission unit 40601.

A feedback to the status determining request may be received by the receiving module 40602 from the peer terminal.

The confirmation unit 40603 may determine whether the status of the peer terminal meets with the certain standard based on the received feedback.

When the local terminal is in a non-stationary state, call forwarding instruction may be transmitted by the transmitting unit 4030 to the peer terminal to notify the peer terminal that the local terminal may be used to respond to a call or to instruct the peer terminal to forward a call to the local terminal.

In an example embodiment, the local terminal may further include a second detecting unit 4070.

The second detecting unit 4070 may be configured to determine whether status of the local terminal meets with a certain standard when the local terminal is in the non-stationary state.

When the status of the local terminal does not meet with the certain standard, the call forwarding instruction may be transmitted to the peer terminal.

In an example embodiment, the local terminal may further include a third detecting unit 4080 and a second determining unit 4090.

The third detecting unit 4080 may be configured to determine whether status of the local terminal meets with a certain standard.

When the status of the local terminal does not meet with the certain standard, the call forwarding condition of the local terminal may be determined by the second determining unit 4090 to be satisfied.

In an example embodiment, the local terminal may further include a second confirmation unit 4010.

The second confirmation unit 40100 may be configured to determine whether status of the peer terminal meets with a certain standard when the status of the local terminal does not meet with a certain standard.

When the status of the peer terminal meets with the certain standard, the call forwarding condition may be determined by the second determining unit 40100 to be satisfied.

In an example embodiment, the certain standard may include a certain value of a signal strength and a remaining battery, but is not limited thereto.

In an example embodiment, the local terminal may further include a releasing unit 40110.

The release unit 40100 may be configured to release the call forwarding configuration of the local terminal and the peer terminal when the call forwarding condition is not satisfied.

Units described by referring to FIG. 19 may implemented by the controller 1100, the communication interface 1300, and a combination thereof of the electronic device 1000.

A function of each unit of the local terminal may correspond to each operation described by referring to FIGS. 16 and 17.

According to example embodiments, the local terminal may pre-acquire identification information of a peer terminal and the identification information is configured as a call forwarding number of the local terminal, and then a call forwarding instruction including the identification information may be transmitted to an external device.

According to example embodiments, a call may be forwarded between devices based on status of the devices.

Figure 20:
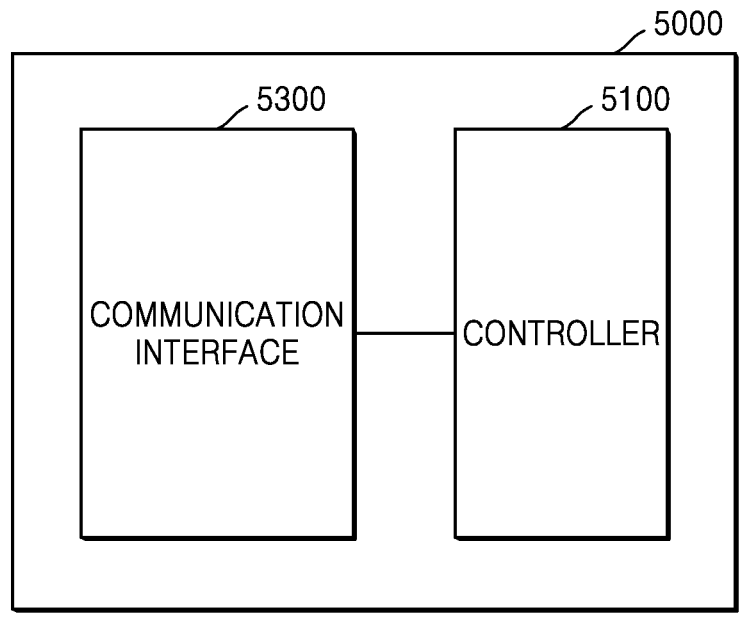
FIG. 20 illustrates an example electronic device according to an example embodiment.

FIG. 20 illustrates an example electronic device according to an example embodiment.

The terminals, apparatuses, and devices described above may be an electronic device 5000 illustrated in FIG. 20.

Referring to FIG. 20, the electronic device 5000 may include a controller 5100 and a communication interface 5300.

Each unit of the terminals described above may be implemented by a unit or a combination of units of the electronic device 5000.

The electronic device 5000 may communicate with an external device by the communication interface 5300, and the processor 5100 may control overall operations of the electronic device 5000.

The communication interface may be configured to receive identification information of at least one mobile device from the at least one mobile device under control of the controller 5100.

The controller 5100 may determine based on the received identification information the at least mobile device as a peer terminal which performs an operation of the electronic device 5000 with or instead of the electronic device 5000.

In an example embodiment, every mobile device connected to or associated with the electronic device 5000 may be determined as peer terminals. The electronic device 5000 may communicate with the at least one mobile device via a short range communication such as Wi-Fi, ZigBee, NFC, and Bluetooth, but is not limited thereto. In an example embodiment, a mobile device that is logged in with the same account with the electronic device 5000 may be determined as the peer terminal.

The controller 5100 may determine a subject performing an operation of the electronic device 5000 among the peer terminal and the electronic device 5000.

In an example embodiment, the controller 5000 may determine at least one from among the peer terminal and the electronic device 5000 based on status of the electronic device 5000, and the determined at least one may perform an operation of the electronic device 5000. An explanation regarding the status of the electronic device 5000 may be equivalent to the explanation regarding the status of the local terminal in FIGS. 16, 17, 18, and 19.

In an example embodiment, the controller 5000 may determine which one of the peer terminal and the electronic device 5000 based on status of the peer terminal to perform an operation of the electronic device 5000. An explanation regarding the status of the peer terminal may be equivalent to the explanation regarding the status of the peer terminal in FIGS. 16, 17, 18, and 19.

Figure 21:
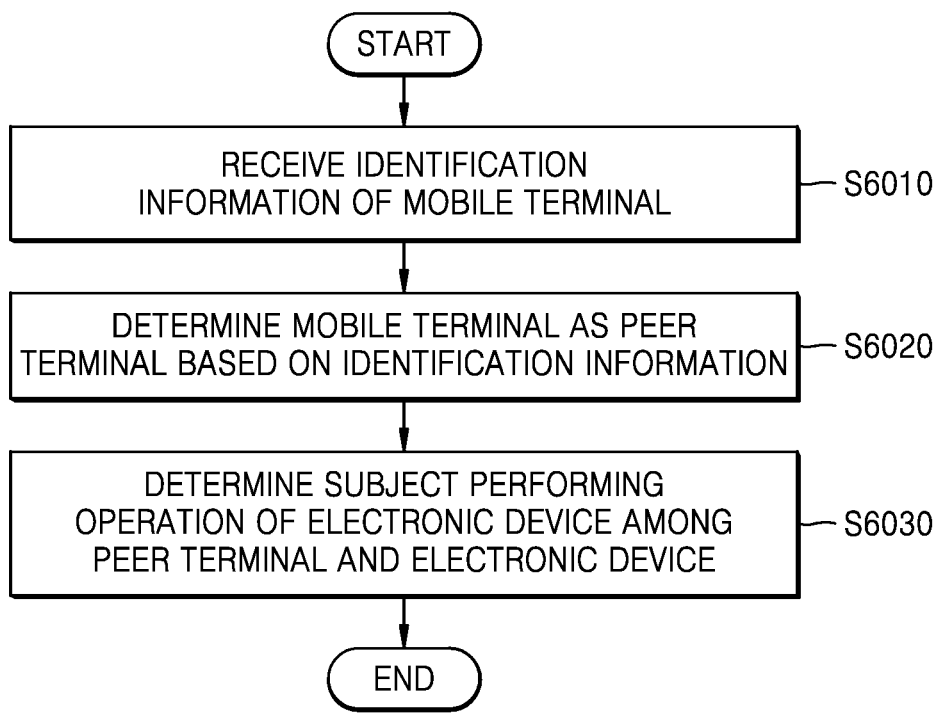
FIG. 21 illustrates a flowchart of a method of performing an operation by proxy, according to an example embodiment.

FIG. 21 illustrates a flowchart of a method of performing an operation by proxy according to an example embodiment.

According to an example embodiment, operations of an electronic device may be performed in another device such as a mobile terminal. For example, a receiving operation of receiving a call or message to the electronic device, a searching operation required by an application of the electronic device, an authentication operation requested by an external server based on a web resource accessed by the electronic device, an installation operation of installing an application in the electronic device may be performed in the other device such as the mobile terminal.

An explanation regarding the receiving operation is equivalent to the description of FIGS. 16, 17, 18, and 19.

An explanation regarding the searching operation and authentication operation is equivalent to the description of FIGS. 1, 2, 3, 4, 5, 6, 7, 8A, 8B, 9, 10, 11, 12, and 13.

An explanation regarding the installation operation is equivalent to the description of FIGS. 14A, 14B, and 15.

The electronic device and mobile terminal described above may be the electronic device 2000 illustrated in FIG. 20.

In operation S6010, an electronic device may receive identification information of a mobile terminal from the mobile terminal.

The electronic device may receive identification information of one or more mobile terminals from the one or more mobile terminals.

The identification information may further include information regarding subscriber identity module (SIM) card number, universal subscriber identity module (USIM) card number, ID number, and a phone number of the mobile terminal, but is not limited thereto.

The identification information of the mobile terminal may be received by the electronic device via a short range communication such as Wi-Fi, ZigBee, NFC, and Bluetooth, but is not limited thereto, and the identification information may be received via a long range communication.

In operation S6020, the electronic device may determine at least one mobile device as a peer terminal based on the identification information received in operation S6010.

The mobile terminal determined as the peer terminal may perform an operation of the electronic device.

In operation S6030, the electronic device may determine a subject which performs an operation of the electronic device among the electronic device and the peer terminal.

In an example embodiment, the electronic device may determine a subject which performs an operation of the electronic device among the electronic device and the peer terminal based on status of the electronic device. An explanation regarding the status of the electronic device may be equivalent to the explanation regarding the status of the local terminal in FIGS. 16, 17, 18, and 19.

In an example embodiment, the electronic device may determine a subject which performs an operation of the electronic device among the electronic device and the peer terminal based on status of the peer terminal. The electronic device may determine at least one peer terminal among a plurality of peer terminals based on status of the plurality of peer terminals, the determined at least one peer terminal performing an operation of the electronic device. That is, a peer terminal may not perform an operation of the electronic device based on its status. An explanation regarding the status of the peer terminal may be equivalent to the explanation regarding the status of the peer terminal in FIGS. 16, 17, 18, and 19.

In an example embodiment, the electronic device may exclude a peer terminal based on functions of the peer terminal from subject candidates which are capable of performing an operation of the electronic device. An explanation regarding excluding a peer terminal is equivalent to the explanation of FIGS. 7, 8A, 8B, 9, 10, 11, 12, and 13.

According to an example embodiment, an operation of the electronic device may be performed in other electronic device to provide a user with seamless user experience. According to an example embodiment, data of an electronic device may be synchronized with that of other devices without using a cloud server. Therefore, a storage of devices may not be wasted.

Figure 22:
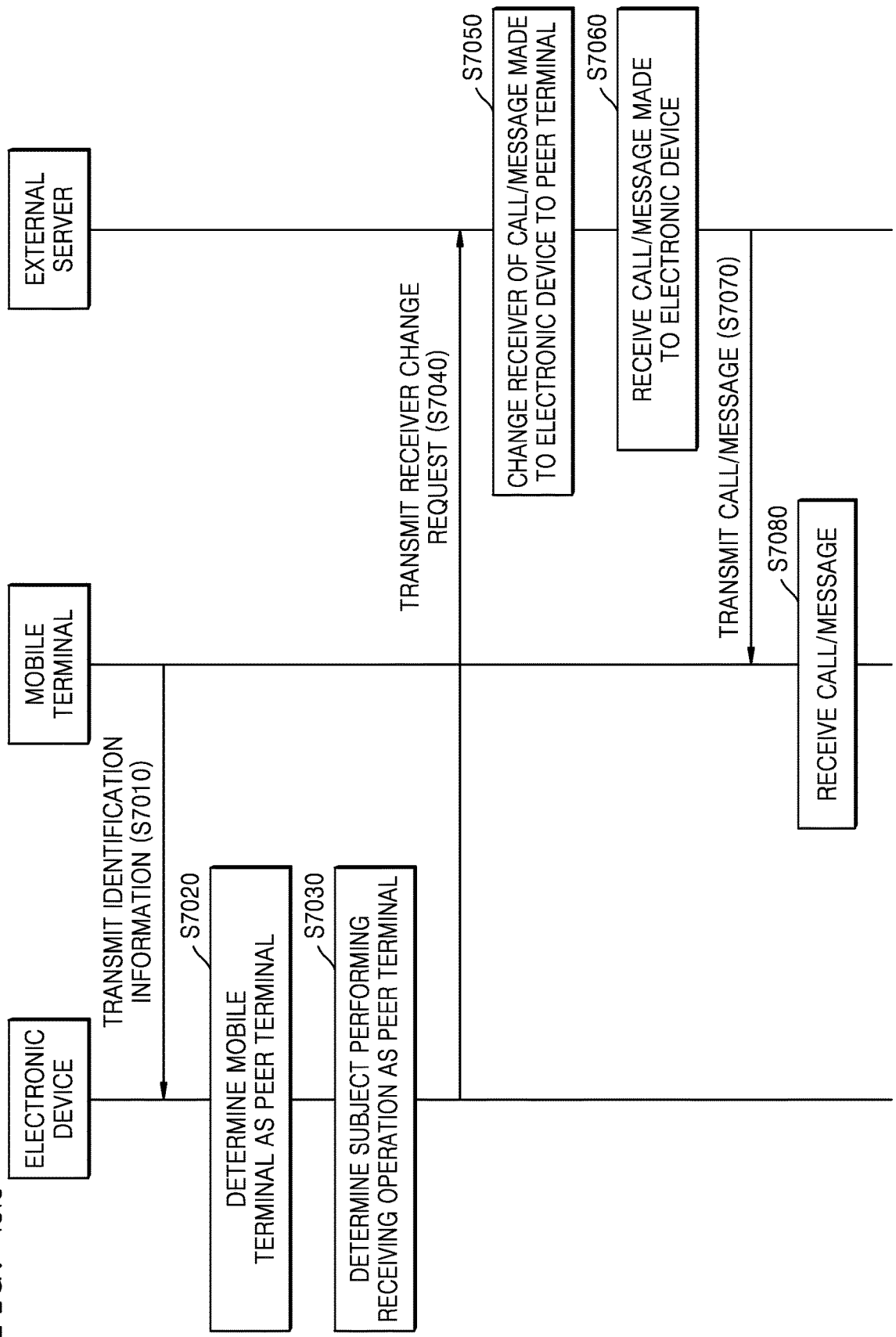
FIG. 22 illustrates a flowchart of a method of performing a receiving operation by proxy, according to an example embodiment.

FIG. 22 illustrates a flowchart of a method of performing a receiving operation by proxy, according to an example embodiment.

A receiving operation of receiving a call and/or message to an electronic device may be performed in a peer terminal of the electronic device. The receiving operation is described below.

In operation S7010, a mobile terminal may transmit its identification information to an electronic device.

Here, a plurality of mobile terminals may transmit their identification information to the electronic device.

In operation S7020, the electronic device may determine the mobile device as a peer terminal based on the identification information transmitted in operation S7010.

In operation S7030, the electronic device may determine the peer terminal as a subject performing the receiving operation.

In an example embodiment, the electronic device may determine a subject which performs the receiving operation of the electronic device among the electronic device and the peer terminal based on status of the electronic device.

In an example embodiment, the electronic device may determine a subject which performs the receiving operation of the electronic device among the electronic device and the peer terminal based on status of the peer terminal.

An explanation regarding the status of the electronic device and the peer terminal is equivalent to the description of FIGS. 16, 17, 18, and 19.

In operation S7040, the electronic device may transmit a receiver change request to an external server when a subject performing the receiving operation is determined as the peer terminal.

The receiver change request is of request of changing a receiver of a call and message made to the electronic device to other device such as the peer terminal.

In operation S7050, the external server may change a receiver of a call and message made to the electronic device to the peer terminal in response to the receiver change request.

In operation S7060, upon receiving a call or message made to the electronic device, the external server may transmit the call or message to the peer terminal. That is, the external server may provide a user with a call forwarding service.

In operation S7080, the peer terminal may receive the call or message made to the electronic device from the external server.

When the peer terminal responds to a missing call made to the electronic device, a sender may be displayed as the electronic device.

FIG. 23 illustrates an example electronic device according to an example embodiment.

The electronic device 5000 illustrated in FIG. 20 may correspond to an electronic device 1000 illustrated in FIG. 23, the controller 5100 to a controller 1100, and the communication interface 5300 to a communication interface 1300.

The terminals, apparatuses, and devices described above may be the electronic device 1000 illustrated in FIG. 23. The electronic device 5000 may be embodied by more or less components than shown in FIG. 20. For example, as illustrated FIG. 23, the electronic device 1000 may further include a mobile communication interface 1200, a communication interface 1400, a multimedia unit 1500, a camera 1600, an input/output unit 1700, a sensor 1800, a storage 1900.

Each unit of the terminals described above may be implemented by a unit or a combination of units of the electronic device 1000.

Details of each component of the electronic device 1000 are described below.

The controller 1100 may perform various functions of the electronic device 1000 by controlling overall operations of the electronic device 1000. For example, the controller 1100 may execute programs stored in the storage 1900 to control the communication interface 1300, multimedia unit 1400, camera 1500, input/output unit 1600, sensor 1700, storage 1900, and the display 1800.

The controller 1100 may include at least one processor 1110. The controller 1100 may include a read-only memory (ROM) 1120 that stores a control program for controlling the electronic device 1000. Also, the controller 1100 may store a signal or data input from other external devices, such as a server. The controller 1100 may include a random access memory (RAM) 1130 that is used as a storage for various operations performed by the electronic device 1000.

The processor 1110 may include a graphic processing unit (GPU) for a graphic processing. The processor 1110 may be embodied as a system-on chip (SoC) including a core and the GPU. The processor 1100 may include a single core processor, a dual core processor, a triple core processor, a quad core processor, or a multiple core processor. The processor 1110, ROM 1120, and RAM 1130 may be connected to each other through a bus.

The electronic device 1000 may communicate with other external devices, such as a server, through the mobile communication interface 1200 and the communication interface 1300.

The communication interface 1300 may include a wireless LAN 1310, and a short range communication interface 1320.

The electronic device 1000 may be wirelessly connected to an access point (AP) through the wireless LAN 1310 at a place where the AP is installed. The wireless LAN 1310 may include, for example, Wi-Fi. The wireless LAN 1310 may support IEEE802.11x of IEEE. The short range communication interface 1320 may communicate with other devices without the AP.

The short-range communicator 1320 may include a BLUETOOTH communicator, a BLUETOOTH Low Energy (BLE) communicator, a Near Field Communicator, a WLAN communicator, a ZigBee communicator, an Infrared Data Association communicator, a Wi-Fi Direct communicator, an Ultra WideBand communicator, an Ant+ communicator, a Z-wave communicator, etc.

The mobile communication interface 1200 may communicate a radio signal with at least one from among a base station, an external terminal, and a server via a mobile communication networks. The mobile communication interface 1200 may communicate the radio signal, which is used for a voice call, a video call, a short message service (SMS), a multimedia message service (MMS), with other devices having a phone number. Here, the radio signal may be a voice call signal, a video call signal, or data in any one of various formats according to transmission and reception of a text/multimedia message.

The multimedia unit 1400 may include a broadcast receiver 1410, an audio playing unit 1420, or a video playing unit 1430.

The broadcast receiver 1410 may receive, through an antenna, a broadcasting signal (for example, a TV broadcasting signal, a radio broadcasting signal, or a data broadcasting signal) and additional broadcasting information (for example, electronic program guide (EPS) or electronic service guide (ESG)) transmitted from a broadcasting station according to control by the controller 1100. Also, the controller 1100 may play the received broadcasting signal and additional broadcasting information through the display 1900 by using a video codec and an audio codec.

The audio playing unit 1420 may play, according to control by the controller 1100, an audio source (for example, an audio file having a file extension that is mp3, wma, ogg, or way) stored in the storage unit 1900 of the electronic device 1000 or received from the outside by using the audio codec.

The audio playing unit 1420 may play, according to control by the controller 1100, an acoustic feedback (for example, an output of the audio source stored in the storage 1900, or the like), corresponding to an input received through the input/output unit 1600 by using the audio codec.

The video playing unit 1430 may play video data (for example, a video file having a file extension that is mpeg, mpg, mp4, avi, mov, or mkv) stored in the storage 1900 of the electronic device 1000 or received from the outside by using the video codec. An application executed in the electronic device 1000 may play audio data or video data by using the audio codec and/or the video codec. Also, a multimedia application executed in the electronic device 1000 may play the audio data and/or the video data by using a hardware codec and/or a software codec.

It may be easily understood by one of ordinary skill in the art that various kinds of video codecs and audio codecs are produced and sold depending on the kind of an audio/video file.

A still image or a video may be photographed by the camera 1500. The camera 1500 may obtain an image frame of the still image or the video by using an image sensor. The image frame photographed by the image sensor may be processed by the controller 1100 or a separate image processor. The processed image frame may be stored in the storage 1900 or may be transmitted to other devices through the communication interface 1300.

The camera 1500 may capture an image of a face of a user, and the controller 1100 may acquire a visual focus of the user based on the captured image. The controller 1100 may determine display a content based on the visual focus of the user. For example, the controller may highlight a POI in an area where the visual focus is on.

The camera 1500 may include a first camera 1510 and a second camera 1520 which are located at different positions in the electronic device 1000. For example, the first camera 1510 may be located on a front surface of the electronic device 1000, and the second camera 1520 may be located on a rear surface of the electronic device 1000. For example, the first camera 1510 and the second camera 1520 may be located adjacent to each other on one surface of the electronic device 1000. For example, when the first camera 1510 and the second camera 1520 are located adjacent to each other on the one surface of the electronic device 1000, a 3D still image or a 3D video may be photographed by using the first camera 1510 and the second camera 1520. The camera 1500 may further include a number of cameras in addition to the first and second cameras 1510 and 1520.

The camera 1500 may include a flashlight 1530 that provides an amount of light necessary for photographing. Also, the camera 1500 may further include an additional lens, which is detachably attached to a separate adaptor, for a wide angle photograph, telephoto photograph, and/or close-up photograph.

Data may be inputted to the electronic device 1000 through the input/output unit 1600, and data processed by the electronic device 1000 may be outputted through the input/output unit 1600.

The input/output unit 1600 may include at least one of a button 1610, a microphone 1620, a speaker 1630, and a vibration motor 1640, but is not limited thereto. In other example embodiments, the input/output unit 1600 may include various input/output devices.

The button 1610 may be located on a front surface, a rear surface, or a side surface of the electronic device 1000. For example, the button 1610 may be a home button, a menu button, a return button, and/or the like located on a lower portion of the front surface of the electronic device 1000. The button 1610 may be a lock button, a volume button, and/or the like located on the side surface of the electronic device 1000.

The button 1610 may be implemented as touch buttons located on a bezel on the exterior of a touch screen.

When the electronic device 1000 is a smart-watch, the button 1610 may be a crown of the smart-watch.

An electrical signal may be generated based on a sound signal which is inputted through the microphone 1620 from the outside. The electrical signal generated by the microphone 1620 may be converted by the audio codec to be stored in the storage 1900 or to be outputted through the speaker 1630. The microphone 1620 may be located at any position such as the front surface, the side surface, the rear surface, or the like of the electronic device 1000. The electronic device 1000 may include a plurality of microphones. Various noise removal algorithms for removing noise occurring while an external sound signal is being received may be used.

A sound corresponding to various signals (for example, a radio signal, a broadcasting signal, an audio source, a video file, photographing, and/or the like) received by the communicator 1300, the multimedia unit 1400, the camera 1500, the input/output unit 1600, or the sensor 1700 and an audio source or a video source stored in the storage 1900, may be outputted to the outside of the electronic device 1000 through the speaker 1630.

The speaker 1630 may output a sound (for example, a touch sound corresponding to a phone number input or a photographing button sound) corresponding to a function performed by the electronic device 1000. The speaker 1630 may be located at any position such as the front surface, the side surface, the rear surface, or the like of the electronic device 1000. The electronic device 1000 may include a plurality of speakers.

The vibration motor 1640 may convert an electrical signal into a mechanical vibration. The vibration motor 1640 may include a linear vibration motor, a bar type vibration motor, a coin type vibration motor, or a piezoelectric vibration motor. The vibration motor 1640 may generate a vibration corresponding to an output of audio data or video data. The vibration motor 1640 may generate a vibration corresponding to various signals received by the communication interface 1300, multimedia unit 1400, camera 1500, input/output unit 1600, or sensor 1700.

The vibration motor 1640 may vibrate the electronic device 1000, or a part of the electronic device 1000. The electronic device 1000 may include two or more vibration motors.

The input/output unit 1600 may further include a touch pad, a connector, a keypad, a jog wheel, a jog switch, an input pen, and/or the like.

The touch pad may be embodied as a capacitive type, a resistive type, an infrared sensing type, a surface acoustic wave propagation type, integral strain gauge type, piezo-effect type, and electromagnetic resonance type, but is not limited thereto. The touch pad may construct a layer structure with the display 1800, or may be directly located on the display 1800, thereby functioning as a touch screen.

In an example embodiment, when the display 1900 is a touch screen that receives a touch input of a user, the controller 1100 may determine display brightness of pieces of content, based on a position of the received touch input. For example, when the display 1900 displays pieces of content, the controller 1900 may further reduce display brightness of content, which becomes farther away from a position of a received touch input, among the displayed pieces of content.

The touch pad may detect a proximity touch as well as a real-touch, both of which may be referred to as a touch.

The real touch may be made by bringing a pointer into contact with the touch pad, and the proximity touch may be made by bring the pointer closer to the touch pad.

The pointer denotes a touch instrument for the real touch or the proximity touch. For example, the pointer may be a stylus pen, a finger, etc.

The electronic device 1000 may further include a tactile sensor or a pressure detecting sensor for more precise sensing. The tactile sensor may detect various information such as a roughness of a contact surface, hardness of a contacting object, and a temperature at a contact point.

Pressure of touch may be sensed by the pressure detecting sensor. Different functions may be performed based on the pressure of touch.

Different functions may be performed based on gesture inputs. For example, the gesture inputs may include a tab input, a double tap input, a multiple tap input, a long tab input, a long tab input, a drag input, a swipe input, a pinch-out input, a pinch-in input, etc. For example, the gesture inputs may include a long tap that is applied for a certain period of time.

A drag input may be received by moving a pointer touched. A swipe input may be received by moving a pointer quickly.

A pinch-out input and pinch-in input may be received by moving two pointer touched.

A connector may be used as an interface for the electronic device 1000 and a power source connected each other. The electronic device 1000 may, according to control by the controller 1100, transmit data stored in the storage 1900 to other devices or receive data through a cable connected to the connector. Power may be applied to the electronic device 1000 through the cable connected to the connector, and a battery of the electronic device 1000 may be charged with the power. Also, the electronic device 1000 may be connected to an external accessory (for example, a speaker, a keyboard dock, and/or the like) through the connector.

Key inputs may be received by a keypad. For example, the keypad may be a virtual keypad displayed on a touch screen, a physical keypad.

The sensor 1700 may include at least one sensor for detecting a state of the electronic device 1000. For example, the sensor 1700 may include a proximity sensor 1710 that detects whether an object approaches to the electronic device 1000, an illuminance sensor 1720 that detects the amount of ambient light, and a gyro sensor 1730 that measures an angular speed with respect to each of the X axis, the Y axis, and the Z axis to measure a changed angle, but is not limited thereto.

The sensor 1700 may include a global positioning system (GPS) for detecting a location of the electronic device 1000. In an outdoor place, a location of the electronic device 1000 may be calculated by the GPS.

In an indoor place, the location of the electronic device 1000 may be calculated by using a wireless access point (AP). In the indoor place, the location of the electronic device 1000 may be calculated by a cell-identifier (cell-ID) method using an identifier of the AP, an enhanced cell-ID method further using received signal strength (RSS), or an angle of arrival (AoA) method using an angle at which a signal transmitted from the AP. In the indoor place, the location of the electronic device 1000 may be calculated by using a wireless beacon.

The sensor 1700 may include a magnetic sensor that detects azimuth by using an earth's magnetic field, an acceleration sensor that measures an angular speed (an acceleration of gravity and an acceleration of a motion) with respect to each of the X axis, the Y axis, and the Z axis, a gravity sensor that detects a direction where gravity acts, an RGB sensor that measures a concentration of red, green, blue, and white (RGBW) of lights, a hall sensor that senses a magnetic field, a magnetometer that measures an intensity of a magnetic field, an infrared (IR) sensor that senses a motion of a user's hands by using IR light, an altimeter that recognizes a gradient and measures atmospheric pressure to detect an elevation, a finger scan sensor, a heart rate sensor, a pressure sensor, ultraviolet (UV) sensor, a temperature humidity sensor, or a motion recognition sensor that recognizes a movement of a position of an object.

The storage 1900 may store various types of data and programs for controlling the electronic device 1000 according to control by the controller 1100. The storage 1900 may store a signal or data inputted/outputted and corresponded to controlling of the communication interface 1300, the input/output unit 1600, and the display 1900. For example, the storage 1900 may store data for a graphic user interface (GUI) associated with programs or applications, user information, documents, databases, and relevant data, but is not limited thereto.

The storage 1900 may include a non-volatile memory, a volatile memory, a hard disk drive (HDD), a solid state drive (SSD), etc. The storage 1900 may be referred to as a memory.

The display 1800 may include a plurality of pixels, and display information processed by the electronic device 1000. For example, a screen of an operating system, a screen of an application system executed in the operating system may be displayed on the display 1800. The controller 1100 may control display of a graphical user interface corresponding to various functions such as voice call, video call, data transmission, broadcasting reception, photographing, video play, application execution, etc.

The display 1800 may include at least one from among a liquid crystal display, a thin-film transistor-liquid crystal display, an organic light-emitting diode, a flexible display, a 3D display, an electrophoretic display, and a vacuum fluorescent display.

Furthermore, the electronic device 1000 may include two or more displays 1800 according to embodiments. The two or more displays may be disposed to face each other across a hinge.

All references including publications, patent applications, and patents, cited herein, are hereby incorporated by reference to the same extent as if each reference were individually and specifically indicated to be incorporated by reference and were set forth in its entirety herein.

Various embodiments of the present disclosure may be embodied as on a computer readable recording medium including computer readable codes such as a program module executable at a computer. A computer readable recording medium may be volatile, non-volatile, or a combination of volatile and non-volatile, where appropriate. The computer readable recording medium includes a computer storage medium and communication medium. The computer storage medium may include a computer readable instruction, a data structure, a program module, or any medium, but is not limited thereto. The communication medium may include any information transmission medium such as a carrier wave.

The exemplary embodiments may be represented using functional block components and various operations. Such functional blocks may be realized by any number of hardware and/or software components configured to perform specified functions. For example, the exemplary embodiments may employ various integrated circuit components, e.g., memory, processing elements, logic elements, look-up tables, and the like, which may carry out a variety of functions under control of at least one microprocessor or other control devices. As the elements of the exemplary embodiments are implemented using software programming or software elements, the exemplary embodiments may be implemented with any programming or scripting language such as C, C++, Java, assembler, or the like, including various algorithms that are any combination of data structures, processes, routines or other programming elements. Functional aspects may be realized as an algorithm executed by at least one processor. Furthermore, the exemplary embodiments may employ related techniques for electronics configuration, signal processing and/or data processing. The terms 'mechanism', 'element', 'means', 'configuration', etc. are used broadly and are not limited to mechanical or physical embodiments. These terms should be understood as including software routines in conjunction with processors, etc.

Embodiments of the present disclosure should be understood as various examples, and should not be interpreted as limitation of embodiments. For the sake of brevity, related electronics, control systems, software development and other functional aspects of the systems may not be described in detail. Furthermore, the lines or connecting elements shown in the appended drawings are intended to represent exemplary functional relationships and/or physical or logical couplings between the various elements. It should be noted that many alternative or additional functional relationships, physical connections or logical connections may be present in a practical device. Moreover, no item or component is essential to the practice of the exemplary embodiments unless it is specifically described as "essential" or "critical."

The use of the terms "a", "an", and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The operations of all methods described herein can be performed in an appropriate order unless otherwise indicated herein or otherwise clearly contradicted by context. The exemplary embodiments are not limited by an order in which the operations are described herein. The use of any and all examples, or exemplary language (e.g., "such as") provided herein, is intended merely to clearly describe the exemplary embodiments and does not pose a limitation on the exemplary embodiments unless otherwise claimed. Numerous modifications and adaptations will be readily apparent to those of ordinary skill in this art without departing from the spirit and scope of the exemplary embodiments.

The invention claimed is:

1. An electronic device comprising:
   a memory storing instructions; and
   at least one processor configured to execute the instructions to:
     obtain a search request including a keyword for searching for an image from a user,
     identify, based on the search request, a peer device having a camera and an image browsing application from among a plurality of peer devices connected to the electronic device,
     transmit the keyword and characteristic information of the image browsing application to the identified peer device based on identifying that the peer device has the camera and the image browsing application such that the identified peer device searches for at least one image corresponding to the keyword from among images previously stored in the image browsing application of the identified peer device, wherein the images previously stored are acquired through the camera disposed on the identified peer device, and
     output the at least one image corresponding to the keyword received from the identified peer device as a response to the search request from the user.

2. The electronic device of claim 1, wherein the at least one processor is further configured to execute the instructions to:
   identify a plurality of external devices as the plurality of peer devices for performing an operation for the electronic device.

3. The electronic device of claim 1,
   further comprising a display, and
   wherein the at least one processor is further configured to execute the instructions to:
     cause the display to display the at least one image corresponding to the keyword received from the identified peer device.

4. The electronic device of claim 1, wherein the electronic device and the identified peer device are linked to the same account of the user.

5. The electronic device of claim 1, wherein the at least one processor is further configured to execute the instructions to:
   perform a keyword search operation by searching a storage of the electronic device for data based on the keyword.

6. The electronic device of claim 5, wherein the storage of the electronic device comprises the memory.

7. The electronic device of claim 5, wherein the at least one processor is further configured to execute the instructions to:
   output at least one image obtained from the storage of the electronic device based on the keyword with the at least one image corresponding to the keyword received from the identified peer device.

8. The electronic device of claim 1, wherein the keyword is not transmitted to a peer device that does not have a function corresponding to a searching category of the keyword.

9. The electronic device of claim 1, wherein the identified peer device comprises a smartphone.

10. The electronic device of claim 1, wherein the at least one processor is further configured to execute the instructions to:
    transmit a characteristic of an application for a keyword search operation to the identified peer device.

11. The electronic device of claim 10, wherein an application corresponding to the characteristic is executed at the identified peer device to perform the keyword search operation.

12. The electronic device of claim 1, wherein the image browsing application is found on each of the plurality of peer devices.

13. The electronic device of claim 1, wherein the electronic device and the identified peer device are linked based on scanning of a code by each of the electronic device and the identified peer device.

14. The electronic device of claim 1, wherein the images previously stored in the image browsing application of the identified peer device are differentiated from images previously stored in the image browsing application of the electronic device which match the keyword.

15. A method comprising:
    obtaining a search request including a keyword for searching for an image from a user;
    identifying, based on the search request, a peer device having a camera and an image browsing application from among a plurality of peer devices connected to an electronic device;
    transmitting the keyword and characteristic information of the image browsing application to the identified peer device based on identifying that the peer device has the camera and the image browsing application such that the identified peer device searches for at least one image corresponding to the keyword from among images previously stored in the image browsing application of the identified peer device, wherein the images previously stored are acquired through the camera disposed on the identified peer device; and
    outputting the at least one image corresponding to the keyword received from the identified peer device as a response to the search request from the user.

16. The method of claim 15, further comprising:
    performing a keyword search operation by searching a storage of the electronic device for data, based on the keyword.

17. The method of claim 16, further comprising:
    outputting at least one image obtained from the storage of the electronic device based on the keyword with the at least one image corresponding to the keyword received from the identified peer device.

\* \* \* \* \*